United States Patent
Thubert et al.

(10) Patent No.: US 10,439,940 B2
(45) Date of Patent: Oct. 8, 2019

(54) LATENCY CORRECTION BETWEEN TRANSPORT LAYER HOST AND DETERMINISTIC INTERFACE CIRCUIT

(71) Applicant: Cisco Technology, Inc., San Jose, CA (US)

(72) Inventors: Pascal Thubert, La Colle sur Loup (FR); Eric Michel Levy-Abegnoli, Valbonne (FR); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/787,790

(22) Filed: Oct. 19, 2017

(65) Prior Publication Data

US 2019/0124006 A1    Apr. 25, 2019

(51) Int. Cl.
*H04L 12/801* (2013.01)
*H04L 12/853* (2013.01)

(52) U.S. Cl.
CPC ............ *H04L 47/12* (2013.01); *H04L 47/193* (2013.01); *H04L 47/2416* (2013.01); *H04L 47/39* (2013.01)

(58) Field of Classification Search
CPC ....... H04L 47/12; H04L 47/193; H04L 47/39; H04L 47/2416
See application file for complete search history.

(56) References Cited

U.S. PATENT DOCUMENTS

| 7,403,542 B1 | 7/2008 | Thompson |
| 8,085,781 B2 | 12/2011 | Munson et al. |
| 8,301,593 B2 | 10/2012 | Hoffmann et al. |
| 8,682,954 B2 | 3/2014 | Harpaz et al. |

(Continued)

FOREIGN PATENT DOCUMENTS

WO    WO-2017088911 A1 *  6/2017    ............ H04J 3/1611

OTHER PUBLICATIONS

Handley et al., "Re-architecting datacenter networks and stacks for low latency and high performance", SIGCOMM 17, Los Angeles, California, Aug. 21-25, 2017, Association for Computing Machinery (ACM), pp. 29-42.

(Continued)

*Primary Examiner* — Curtis A Alia
(74) *Attorney, Agent, or Firm* — Leon R. Turkevich

(57) ABSTRACT

In one embodiment, a method comprises establishing, by a deterministic device interface circuit, a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit; determining a latency between sending a request for data to a host device via a non-deterministic data link provided by a network switch, and receiving from the host device a transport layer packet responsive to the request; and sending an instruction to the host device for initiating transfer of the transport layer (Continued)

packet, the instruction correcting for the latency and enabling the deterministic device interface circuit to receive the transport layer packet for transmission of a corresponding data packet on the deterministic link at the corresponding transmission instance.

20 Claims, 22 Drawing Sheets

(56) References Cited

U.S. PATENT DOCUMENTS

| | | | |
|---|---|---|---|
| 8,958,426 | B2 | 2/2015 | Van Zijst |
| 9,057,771 | B2 | 6/2015 | Giustiniano et al. |
| 9,652,804 | B2 | 5/2017 | Bonig et al. |
| 2016/0308793 | A1 | 10/2016 | Levy-Abegnoli et al. |
| 2017/0156120 | A1 | 6/2017 | Kopetz |

OTHER PUBLICATIONS

Wetterwald et al., U.S. Appl. No. 15/291,211, filed Oct. 12, 2016.
Thubert et al., U.S. Appl. No. 15/713,827, filed Sep. 25, 2017.
Cisco Data Sheet, "Cisco Industrial Ethernet 4000 Series Switches", [online], 2017, [retrieved on Sep. 28, 2017]. Retrieved from the Internet: URL: <https://www.cisco.com/c/en/us/products/collateral/switches/industrial-ethernet-4000-series-switches/datasheet-c78-733058.pdf>, pp. 1-11.
Cisco Data Sheet, "Cisco Industrial Ethernet 5000 Series Switch", [online], 2017, [retrieved on Sep. 28, 2017]. Retrieved from the Internet: URL: <https://www.cisco.com/c/en/us/products/collateral/switches/industrial-ethernet-5000-series-switches/datasheet-c78-734967.pdf>, pp. 1-10.
Finn, et al., "Deterministic Networking Architecture", [online], DetNet, Internet-Draft, Aug. 8, 2017, [retrieved on Sep. 15, 2017]. Retrieved from the Internet: URL: <https://tools.ietf.org/pdf/draft-ietf-detnet-architecture-03.pdf>, pp. 1-41.
Wikipedia, "Multipath TCP", [online], Feb. 26, 2017, [retrieved on Sep. 15, 2017]. Retrieved from the Internet: <URL: https://en.wikipedia.org/w/index.php?title=Multipath_TCP&printable=yes>, pp. 1-7.
Ford et al., "TCP Extensions for Multipath Operation with Multiple Addresses", Internet Engineering Task Force (IETF), Request for Comments: 6824, [online], Jan. 2013, [retrieved on Sep. 15, 2017]. Retrieved from the Internet: URL: https://tools.ietf.org/pdf/rfc6824.pdf>, pp. 1-64.
IBM, "IBM Communication Controller Migration Guide: Updated for Communication Controller for Linux on System z9 and zSeries (V1.2), Sec. 5.3.2: Multi-link transmission group (MLTG)", [online], [retrieved on Sep. 27, 2017]. Retrieved from the Internet: URL: <http://www.redbooks.ibm.com/redbooks/pdfs/sg246298.pdf>, 12 pages.
Wikipedia, "Audio Video Bridging", [online], Mar. 5, 2017, [retrieved on Aug. 25, 2017]. Retrieved from the Internet: URL: <https://en.wikipedia.org/w/index.php?title=Audio_Video_Bridging&printable=yes>, pp. 1-11.
Wikipedia, "Real-time Transport Protocol", [online], Sep. 10, 2017, [retrieved on Sep. 15, 2017]. Retrieved from the Internet: URL: <https://en.wikipedia.org/w/index.php?title=Real-time_Transport_Protocol&printable=yes>, pp. 1-4.
Wikipedia, "Time-Sensitive Networking", [online], Aug. 8, 2017, [retrieved on Aug. 25, 2017]. Retrieved from the Internet: URL: <https://en.wikipedia.org/w/index.php?title=Time-Sensitive_Networking&printable=yes>, pp. 1-7.
Thubert et al., U.S. Appl. No. 15/784,401, filed Oct. 16, 2017.
Thubert et al., U.S. Appl. No. 15/725,502, filed Oct. 5, 2017.
Thornburgh, "Adobe's Secure Real-Time Media Flow Protocol", Internet Engineering Task Force (IETF), Request for Comments: 7016, Nov. 2013, pp. 1-113.
Zaher, "Data Link Layer", [online], [retrieved on Oct. 9, 2017]. Retrieved from the Internet: URL: <http://www.cs.virginia.edu/~zaher/classes/CS457/lectures/flow-control.pdf>, pp. 1-12.
IBM, "Rapid transport protocol (RTP)", [online], IBM 1990, 2010, [retrieved on Oct. 9, 2017]. Retrieved from the Internet: URL: <https://www.ibm.com/support/knowledgecenter/zosbasics/com.ibm.zos.znetwork/znetwork_219.htm>, pp. 1-3.
"Estimating the Round Trip Time (RTT)", CS558 Sylabus, [online], [retrieved on Oct. 9, 2017]. Retrieved from the Internet: URL: <http://www.mathcs.emory.edu/~cheung/Courses/455/Syllabus/7-transport/timeout.html>, pp. 1-3.
Wikipedia, "Precision Time Protocol", [online], Oct. 4, 2017, [retrieved on Oct. 9, 2017]. Retrieved from the Internet: URL: <https://en.wikipedia.org/wiki/Precision_Time_Protocol>, pp. 1-8.

* cited by examiner

LATENCY CORRECTION BETWEEN TRANSPORT LAYER HOST AND DETERMINISTIC INTERFACE CIRCUIT

TECHNICAL FIELD

The present disclosure generally relates to a latency correction between a transport layer host and a deterministic interface circuit.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) Deterministic Networking (DetNet) Working Group is addressing proposals for satisfying the stringent requirements of deterministic data networks (e.g., minimal jitter (i.e., minimal packet delay variation), low latency, minimal packet loss, and high reliability). The DetNet Working Group is investigating proposals for networks that are under a single administrative control or within a closed group of administrative control, where such networks within the single/closed group of administrative control can provide forwarding along a multi-hop path with the deterministic properties of controlled latency, low packet low, low packet delay variation, and high reliability. One proposal for low power and lossy network (LLN) devices is a routing protocol that provides IPv6 routing using time slotted channel hopping (TSCH) based on IEEE 802.15.4e ("6TiSCH"), enabling wireless LLN devices to use low-power operation and channel hopping for higher reliability.

Deterministic transmission in wired networks can use time sensitive networking (TSN) and/or audio/video bridging (AVB) for deterministic networks such as professional and home audio/video, multimedia in transportation, vehicle engine control systems, and/or other general industrial and/or vehicular applications. Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

BRIEF DESCRIPTION OF THE DRAWINGS

Reference is made to the attached drawings, wherein elements having the same reference numeral designations represent like elements throughout and wherein:

FIGS. 1A-1J illustrates one or more host devices comprising a transport layer providing deterministic transport of transport layer packets across multiple deterministic links in an example deterministic data network, according to an example embodiment.

Figure 1A:
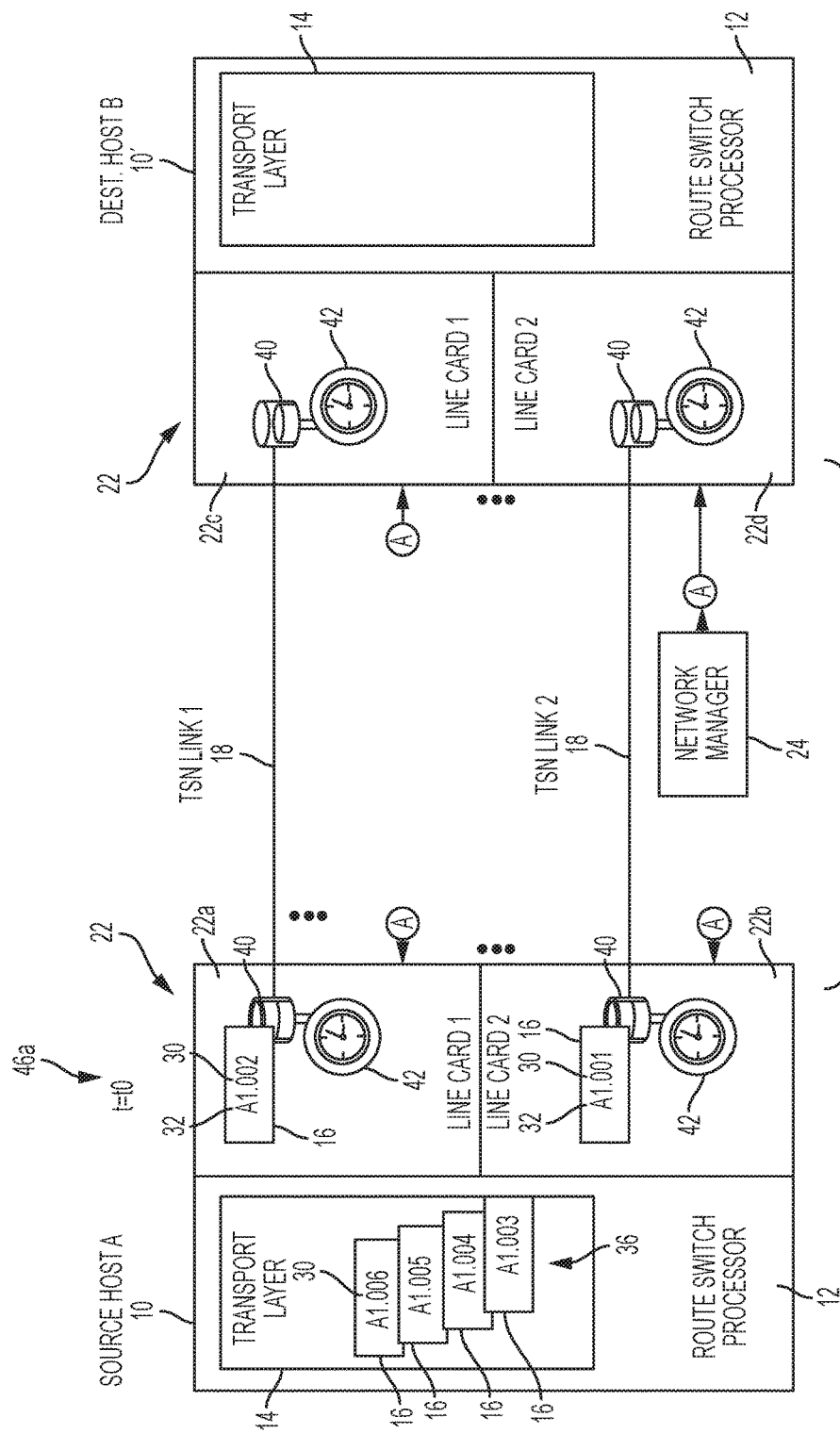

DESCRIPTION OF EXAMPLE EMBODIMENTS
OVERVIEW

In one embodiment, a method comprises: establishing, by a deterministic device interface circuit, a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit; determining a latency between sending a request for data to a host device via a non-deterministic data link provided by a network switch, and receiving from the host device a transport layer packet responsive to the request; and sending an instruction to the host device for initiating transfer of the transport layer packet, the instruction correcting for the latency and enabling the deterministic device interface circuit to receive the transport layer packet for transmission of a corresponding data packet on the deterministic link at the corresponding transmission instance.

In another embodiment, an apparatus comprises a memory circuit, and a deterministic processing circuit. The memory circuit configured for storing a data packet within a transmit buffer. The deterministic processing circuit is configured for establishing a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit. The deterministic processing circuit further is configured for determining a latency between sending a request for data to a host device via a non-deterministic data link provided by a network switch, and receiving from the host device a transport layer packet responsive to the request. The deterministic processing circuit further is configured for sending an instruction to the host device for initiating transfer of the transport layer packet, the instruction correcting for the latency and enabling the apparatus to receive the transport layer packet for transmission of a corresponding data packet on the deterministic link at the corresponding transmission instance.

In another embodiment, one or more non-transitory tangible media are encoded with logic for execution by a machine and when executed by the machine operable for: establishing, by the machine implemented as a deterministic device interface circuit, a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit; determining a latency between sending a request for data to a host device via a non-deterministic data link provided by a network switch, and receiving from the host device a transport layer packet responsive to the request; and sending an instruction to the host device for initiating transfer of the transport layer packet, the instruction correcting for the latency and enabling the deterministic device interface circuit to receive the transport layer packet for transmission of a corresponding data packet on the deterministic link at the corresponding transmission instance.

DETAILED DESCRIPTION

Particular embodiments enable deterministic transport of a flow of application data across multiple deterministic data links (i.e., deterministic links) in a deterministic data network, even if the executable application generating the application data (i.e., the host device) is incapable of providing the flow of application data according to the precise synchronization requirements of the deterministic links, based on a transport layer storing the application data in a transport buffer circuit as transport layer packets, and multiple deterministic network interface circuits deterministically retrieving the transmit layer packets, from the transport buffer circuit in the host device for deterministic transmission across the respective deterministic links.

Each deterministic network interface circuit can deterministically obtain a transmit layer packet from the host device, even if the data connection between the deterministic network interface circuit and the host device is via a non-deterministic data link provided by a network switch (e.g., an unmanaged Ethernet switch), based on correcting for detected latency. The deterministic network interface circuit is configured for determining a latency between sending a request for data to the host device via the non-deterministic data link (via the network switch), and receiving from the host device a transport layer responsive to the request. In response to determining the latency, the deterministic network interface circuit is configured for sending an instruction to the host device for initiating transfer of the transport layer packet, where the instruction corrects for the detected latency. The instruction to the host device enables the deterministic device interface circuit to receive the transport layer packet for transmission of a corresponding data packet on the deterministic link at the corresponding transmission instance.

Hence, example embodiments enable deterministic transport of data between a host device and one or more deterministic network interface circuits, for transport via a deterministic network, even if the data link between the host device and the deterministic network interface circuits suffers from latency, jitter, drift, etc., that otherwise would prevent a deterministic transport of data from the host device to the deterministic network interface circuits.

A description will first be provided of the host device providing deterministic transport of a flow of application data via transport layer packets across multiple deterministic links in a deterministic data network, followed by a description of the transport layer identifying a failure cause and providing mitigation against any increase in latency based on selectively executing a corrective action in response to the identified failure cause. A description will then be provided of executing latency correction between a transport layer host and a deterministic interface circuit.

Transport Layer Providing Deterministic Transport Across Multiple Deterministic Data Links Particular embodiments enable deterministic transport of a flow of application data across multiple deterministic data links (i.e., deterministic links) in a deterministic data network, even if the executable application generating the application data is incapable of providing the flow of application data according to the precise synchronization requirements of the deterministic links, based on a transport layer storing the application data in a transport buffer circuit as transport layer packets having respective transport sequence identifiers that identify their relative positions relative to a transmit order, and causing deterministic network interface circuits to deterministically retrieve the transmit layer packets, in the transmit order, from the transport buffer circuit for deterministic transmission across the respective deterministic links. The transport sequence identifiers enable a destination transport layer to recover the transmit order of the transport layer following the deterministic transmission across the deterministic links, regardless of order of reception thereof by the destination transport layer.

A deterministic data network typically requires strict timing synchronization and scheduling along each hop from a source host to a destination host. A network manager (e.g., a TSN controller, scheduler, etc.) within the deterministic data network can have a prescribed management domain (i.e., deterministic domain) for controlling each network device along the deterministic path, starting with the source deterministic network interface circuits transmitting the data packets into the deterministic data network, continuing with each deterministic switching device along the deterministic path, and ending with the destination deterministic network interface circuits at the end of the deterministic path. Hence, the network controller can establish, for each deterministic data link along a deterministic path, a scheduled transmit time for the corresponding transmitting deterministic network interface circuit, a scheduled receive time for the corresponding receiving deterministic network interface circuit, and a common time reference used for synchronization of each of the deterministic network devices in the deterministic domain. Deterministic networks can be used for industrial automation, vehicle control systems, and other systems that require precise delivery of control commands to a controlled device. However, implementing deterministic networking can include stringent deterministic constraints such as packet delivery within a prescribed latency, zero or near-zero jitter, high packet delivery ratios, etc.

The example embodiments ensure that even if transport layer packets are received at a destination host in a receive order that differs from the transmit order (for example due to the different deterministic links having different relative schedules and/or different latencies), the transport layer executed in the destination host can reorder the received transport layer packets from the received order into the transmit order based on the respective transport sequence identifiers within the received transport layer packets. The example embodiments also can be executed in an intermediate host device that can reorder the received transport layer packets from the received order into the transmit order, prior to retransmission on different deterministic links, for example if the intermediate host device receives the transport layer packets from first deterministic links in a first deterministic domain and causes retransmission in the transport order via second deterministic links in a second different deterministic domain (e.g., using different number of deterministic data links, different schedules, different management entity, etc.).

Existing transport mechanisms (e.g., Transmission Control Protocol, or "TCP") are incapable of providing deterministic transmission of a flow of data packets across multiple deterministic links because such transport mechanisms have constraints that are inconsistent with the requirements of a deterministic network. For example, deterministic networking (e.g., DetNet, TSN) relies on a fixed bandwidth or throughput for reliable delivery of data packets at a precise reception time; in contrast, TCP is configured for adapting to bandwidth variations in non-deterministic data networks by attempting to aggressively claim more bandwidth for data transmission until reaching a point where packet loss occurs, in response to which TCP will "throttle back" its use of bandwidth (e.g., the bandwidth utilization of TCP resembles a sawtooth wave) and retry transmission of the lost data packet after a timeout window. Hence, the variable bandwidth utilization of TCP conflicts with the fixed bandwidth of deterministic networking.

TCP also conflicts with the requirements of a deterministic network device receiving a data packet at a precisely-scheduled receive time, because TCP is configured for retransmitting a lost packet during a retry attempt after a timeout window; hence, any TCP-based retry attempt would be improper in deterministic networking because the retry attempt after the timeout window would be too late, i.e., substantially after the precisely-scheduled receive time.

Further, deterministic networking can establish stringent deterministic constraints based on defining a transmission schedule relative to: (1) a period of time "T"; (2) a maximum packet size "F"; and a maximum number of data packets "N" that can be transmitted on a deterministic link within the period of time "T". Hence, a deterministic network interface circuit can transmit on a deterministic link, at a scheduled transmission time within the period of time "T", a maximum number of "N" data packets having a maximum size "F"; in other words, a data packet exceeding size "F" is dropped (by the receiving deterministic network interface circuit) if transmitted on the deterministic link; further, if "N+1" packets are transmitted on the deterministic link at the scheduled transmission time within the period of time "T", the first "N" packets would be accepted (by the receiving deterministic network interface circuit) and the "N+1" packet would be dropped. TCP does not provide for transmitting, at a scheduled transmission time within the period of time "T", a maximum number of "N" data packets having a maximum size "F".

Hence, example embodiments enable an executable application that generates a flow of application data to utilize multiple deterministic links (as opposed to relying on a single deterministic link such as a TSN link or AVB link, etc.), without the necessity of the executable application coordinating with a network manager that provides time-aware scheduling of the deterministic data links for enforcement of precise synchronization requirements according to prescribed Quality of Service (QoS) Service Level Agreements (SLA) within the deterministic network. As described below, the transport layer can determine a preferred (or optimized) size available on a deterministic link 18 (e.g., 75 kbps), and proactively request additional deterministic links 18 for deterministic transport of the transport layer packets according to the QoS requirements (e.g., 100 kbps) required by the flow of application data.

FIGS. 1A-1J illustrate one or more host devices 10, 10', each comprising a processor circuit 12 configured for executing a transport layer 14 for providing deterministic transport of transport layer packets 16 across multiple deterministic links 18 in an example deterministic data network 20, according to an example embodiment. The deterministic data network 20 of FIGS. 1A-1J is illustrated for simplicity as comprising two or more peer-to-peer TSN data links "TSN Link 1" 18 and "TSN Link 2" between deterministic network interface circuits 22, illustrated as a TSN "Line card 1" 22a, TSN "Line card 2" 22b, TSN "Line card 1" 22c, and TSN "Line card 1" 22d. The deterministic data network 20 also can include a network manager device 24 configured for controlling establishment of the deterministic links 18, by the deterministic network interface circuits 22, according to prescribed deterministic constraints established and maintained by the network manager device 24. In particular, the network manager device 24 can send instructions to each of the deterministic network interface circuits 22 for establishment of a deterministic link 18 with a peer deterministic network interface circuit (i.e., peer deterministic interface circuits) 22 according to the above-described deterministic constraints, including for example a transmission time "t_TSN" according to a repeating schedule, a prescribed transmission period of time "T", and a maximum number of "N" data packets having a maximum size "F" that can be transmitted during the transmission time period "T". The network manager device 24 can cause the deterministic network interface circuits 22 to establish the deterministic links 18, for example as TSN links according to IEEE 802.1Qbv. The maximum size "F" can be established by the Service Level Agreement (SLA), in terms of the maximum packet size "F", and the maximum number of "N" data packets per unit time "T"; alternately, the SLA can specify a minimum delay between packets.

Figure 2:
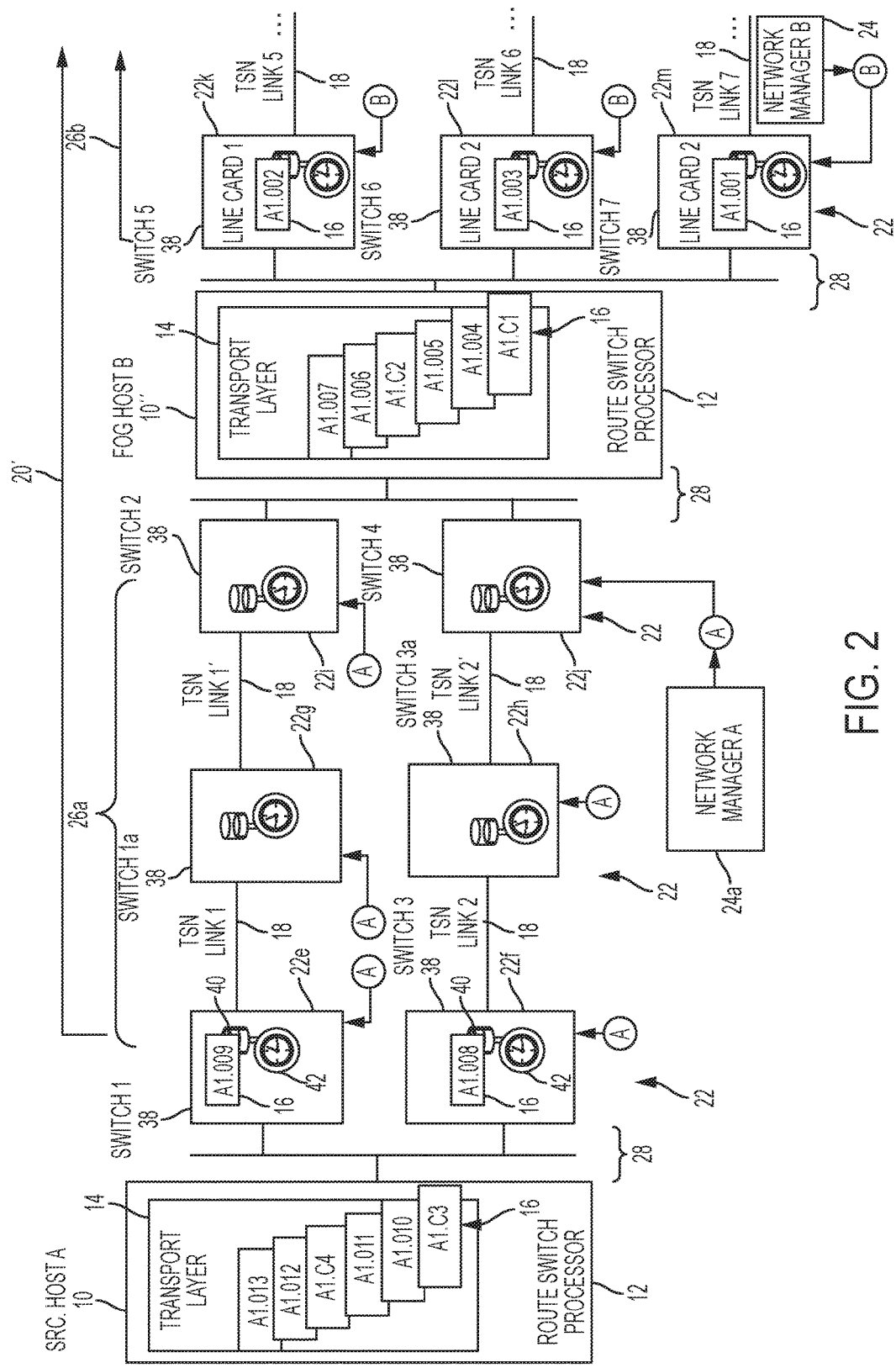
FIG. 2 illustrates a second example deterministic data network having an intermediate host device comprising a transport layer providing deterministic transport of transport layer packets between deterministic links of different distinct deterministic domains, according to an example embodiment.

The deterministic data network 20 also can be implemented as shown FIG. 2, which illustrates a second example deterministic data network 20'. The deterministic data network 20' can include a plurality of deterministic network interface circuits 22 (22e through 22m) implemented within one or more switching devices 38, implemented for example as a commercially-available Cisco® Industrial Ethernet (IE) 4000 Series and/or IE 5000 Series Switch from Cisco Systems, San Jose, Calif. The deterministic data network 20' also includes a first network manager device 24a configured for establishing the deterministic links 18 within a first deterministic domain 26a based on deterministic constraints established by the network manager device 24a and sent to each of the deterministic network interface circuits 22 (e.g., 22e through 22j) establishing the deterministic links 18 in the deterministic domain 26a. As illustrated in FIG. 2, the source host device 10 can be coupled to the deterministic network interface circuits 22e and 22f via a Top-of-Rack (TOR) Switch 28, implemented for example as a commercially-available Cisco® Catalyst 4900 Series Switch from Cisco Systems, San Jose, Calif. Hence, the source host device 10, the TOR switching device 28, and the deterministic network interface circuits 22e and 22f can be implemented within a single rack mount, for example within a data center or within an industrial network.

The deterministic data network 20' also can include a second network manager device 24b configured for establishing the deterministic links 18 within a second deterministic domain 26b based on second different deterministic constraints established by the network manager device 24b and sent to each of the deterministic network interface circuits 22 (e.g., 22k, 22l, 22m, etc.) establishing the deterministic links 18 in the deterministic domain 26b.

Although not shown in FIG. 2, the deterministic domain 26b of the deterministic data network 20 continues with peer deterministic network interface circuits 22 receiving the transport layer packets 16 deterministically transmitted by the switching devices "5", "6", and "7" containing the respective deterministic network interface circuits 22k, 22l, and 22m.

FIG. 2 also illustrates that the deterministic data network 20' includes an intermediate host device 10" that can deterministically reorder the transport layer packets 16 between the deterministic domain 26a and deterministic domain 26b, based on transport sequence identifiers within the received transport layer packets 16, described in further detail below.

As illustrated in FIG. 1A and FIG. 2 and described in further detail below, the transport layer 14 executed by the processor circuit 12 in the source host device 10 is configured for receiving a flow of application data originated by an executable application (34 of FIG. 3): the transport layer 14 executed in the source host device 10 is configured for generating transport layer packets 16 that contain one or more portions of the application data; the transport layer 14 also is configured for generating and inserting into each transport layer packet 16 a corresponding transport sequence identifier 30 that uniquely identifies a corresponding position of the transport layer packet 16 relative to a transport order of the transport layer packets 16. The transport layer 14 also can generate and insert into each transport layer packet 16 a transport flow identifier (e.g., "A1") 32 associated with the flow of application data from the executable application (34 of FIG. 3). The transport layer 14 can generate each transport layer packet 16 according to the deterministic constraints established by the network manager device 24, for example generating within a period of time "T" no more than the maximum number of data packets "N" each having no more than a maximum packet size "F" (minus any data link layer header information added by a deterministic network interface circuit 22, described below).

Hence, the transport layer 14 executed in the source host device 10 (also referred to herein as the "source transport layer") can generate a sequence of transport layer packets 16, containing the flow of application data, according to the deterministic constraints established by the network manager device 24, and where each transport layer packet 16 specifies a corresponding transport sequence identifier 30. As described in further detail below, the transport layer 14 also can cause the transmitting deterministic network interface circuits 22 (e.g., 22a and/or 22b of FIGS. 1A-1G; 22e and/or 22f of FIGS. 1H-1J and/or FIG. 2) to deterministically retrieve the transport layer packets 16, in the transmit order, from a transmit buffer circuit (e.g., 36 of FIG. 3) for deterministic transmission across the respective deterministic links 18.

As illustrated in FIG. 2, the source transport layer 14 also can generate coded packets (e.g., "A1.C1", "A1.C2", "A1.C3", "A1.C4", etc.) associated with the transport layer packets 16, and insert the coded packets into the transport layer transmit buffer circuit 36 for error-protected transmission of the transport layer packets 16. For example the source transport layer 14 can generate the coded packet "A1.C1" as a "1+1" network-coded result of the transport layer packets "A1.004" and "A1.005", enabling a destination to recover the transport layer packet "A1.004" using the transport layer packet "A1.005" and the coded packet "A1.C1". The coded packet (e.g., "A1.C1") can be queued for transmission before the associated protected transport layer packets (e.g., "A1.004" and "A1.005"), enabling immediate recovery if one of the protected transport layer packets is lost.

As illustrated in FIGS. 1A and 2, each deterministic network interface circuit 22 comprises a transmit/receive buffer circuit 40 and a transmit/receive gate circuit 42. The transmit/receive buffer circuit 40 (e.g., in the deterministic network interface circuits 22a, 22b, 22e, 22f, 22g, 22h, and 22k-22m) is configured for storing "transmit" data to be transmitted by the corresponding transmit/receive gate circuit 42 as a link layer data packet (e.g., 44a of FIG. 1B) according to the deterministic constraints established by the network manager device 24; the transmit/receive buffer circuit 40 also can be configured (e.g., in the deterministic network interface circuits 22c, 22d, 22g, 22h, 22i, 22j) for storing "receive" data as the link layer data packet (e.g., 44a of FIG. 1B) is received by the corresponding transmit/receive gate circuit 42 according to the deterministic constraints established by the network manager device 24. Alternately, the transmit/receive buffer circuit 40 can be implemented based on separating the transmit buffer circuit from the corresponding receive buffer circuit, and the transmit/receive gate circuit 42 can be implemented based on separating the transmit gate circuit from the corresponding receive gate circuit.

Hence, the transport layer 14 in the source host device 10 can cause any one of the deterministic network interface circuits 22a and/or 22b to deterministically retrieve a transport layer 14 from the transport layer transmit buffer circuit 36, described in further detail below with respect to FIGS. 4A and 4B. Each transmitting deterministic network interface circuit 22, however, controls the actual time instance that it deterministically fetches the next transport layer packet 16 from the transport layer transmit buffer circuit 36, without the knowledge or control of the transport layer 14. In particular, while the transport layer 14 causes the deterministic retrieval of the transport layer packets 16 from the transport layer transmit buffer circuit 36 (e.g., based on deciding multiple deterministic network interface circuits 22 are needed for deterministic transport of the transport layer packets 16, establishing at least a portion of the deterministic network parameters required for pre-fetching the transport layer packet 16 before the next transmission instance, triggering the deterministic network interface circuits 22 when to begin the process of fetching the transport layer packets 16, etc.), the transport layer 14 is not necessarily part of the deterministic data network 20, and therefore is not aware of the precise transmission instance executed by any of the transmitting deterministic network interface circuits 22. Hence, while the transport layer 14 can cause the deterministic retrieval of the transport layer packets 16 by the deterministic network interface circuits 22, the actual retrieval of a transport layer packet 16 is initiated by a deterministic network interface circuit 22 and not the transport layer 14.

Figure 3:
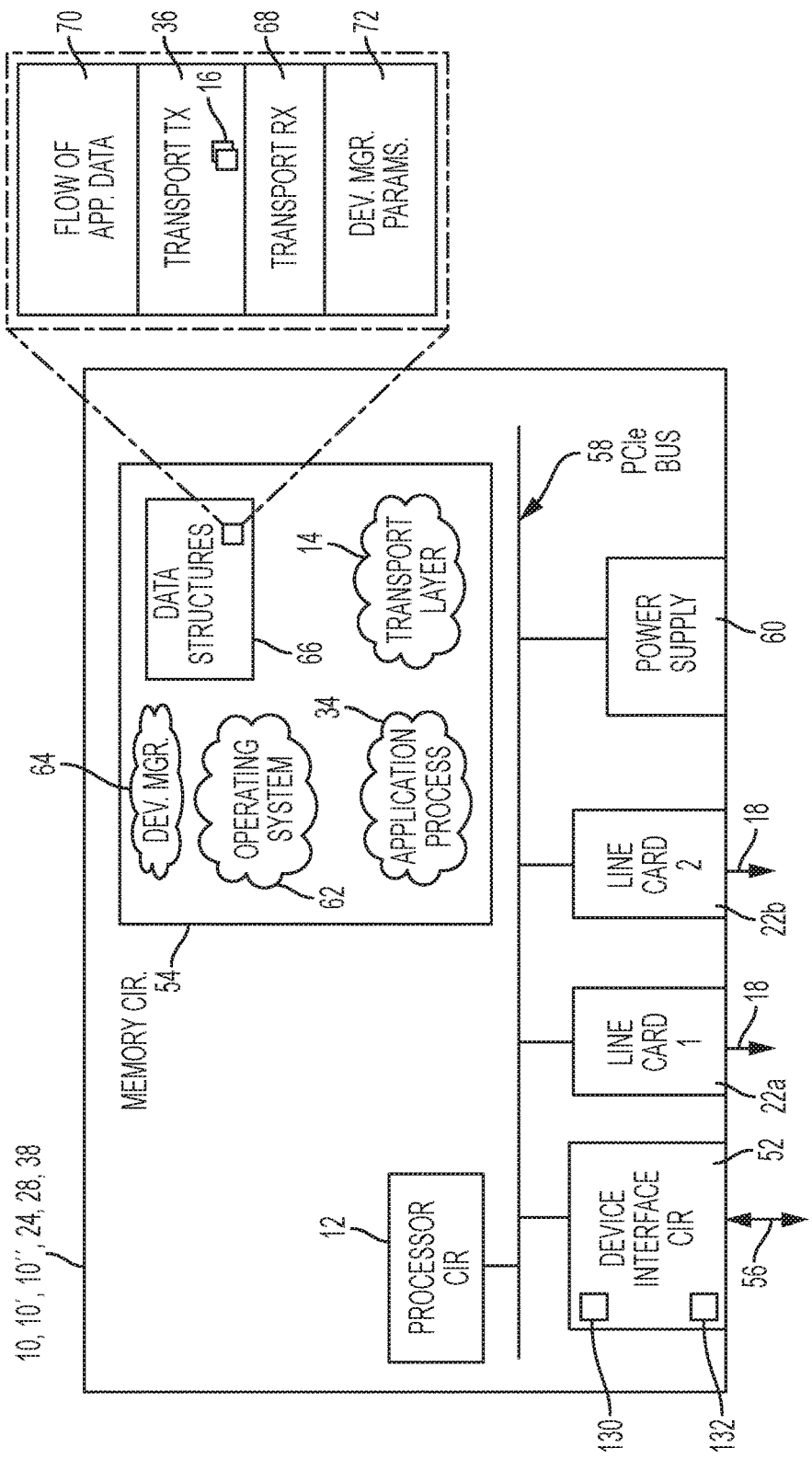
FIG. 3 illustrates an example implementation of any one of the devices of FIGS. 1 and/or 2, according to an example embodiment.

Hence, as illustrated in FIG. 1A, the deterministic network interface circuit 22*b* can deterministically retrieve (from the transport layer transmit buffer circuit 36 illustrated in FIG. 3) the transport layer packet 16 having the transport sequence identifier "001" 30 at a first time instance (126 of FIG. 5) that precedes its corresponding transmission instance (84 of FIG. 5) on the "TSN Link 2" 18 (without knowledge or control by the transport layer 14 in the source host device 10), whereas the deterministic network interface circuit 22*a* can deterministically retrieve from the transport layer transmit buffer circuit 36 the next transport layer packet 16 having the transport sequence identifier "002" 30 (without knowledge or control by the transport layer 14 in the source host device 10). As described in further detail below, the transport sequence identifiers 30 in the transport layer packets 16 enable a destination transport layer 14 (e.g., within the destination host device 10') to recover the transmit order established by the transport layer 14 in the source host device 10, following the deterministic transmission across the deterministic links 18, regardless of order of reception thereof by the destination transport layer 14 in the destination host device 10' or the intermediate host device 10". FIG. 3 illustrates an example implementation of any one of the devices 10, 10', 10", 24, 28, and/or 38 of FIGS. 1A-1J and/or FIG. 2, according to an example embodiment. Each apparatus 10, 10', 10", 24, 28, and/or 38 is a physical machine (i.e., a hardware device) configured for implementing network communications with other physical machines via the deterministic data network 20, 20', and/or another data network (e.g., a local area network (LAN) and/or a Wide Area Network (WAN) such as the Internet). The term "configured for" or "configured to" as used herein with respect to a specified operation refers to a device and/or machine that is physically constructed and arranged to perform the specified operation. Depending on implementation, each device 10, 10', 10", 24, 28, and/or 38 can include a processor circuit 12, a device interface circuit 52 and/or 22, a memory circuit 54 interconnected by a system bus (e.g., PCI Express (PCIe)) 58, and a power supply 60 (e.g., battery, plug-in, etc.).

The device interface circuit 22 and/or 54 can include mechanical, electrical, and signaling circuitry for communicating data with other device interface circuits 22 and/or 54; for example, each device interface circuit 22 and/or 54 can include one or more distinct physical layer transceivers for communication with any one of the other devices of FIG. 1 or 2 as described herein; for example, the device interface circuit 52 can be implemented as a ten Gigabit (10 GB) Ethernet (10GBASE-T) link layer transceiver configured for establishing a data link 56 with any one of the 10, 10', 10", 24, 28, and/or 38 via a non-deterministic data connection (not shown); for example, the non-deterministic data connection could exist within the physical data network (e.g., LAN and/or WAN) that is used to deploy the deterministic data network 20 or deterministic data network 20', where data links that are having unreserved (i.e., "free") intervals that are not reserved for deterministic transport can be used for non-deterministic data connections. Alternately, one or more of the 10, 10', 10", 24, 28, and/or 38 (e.g., the host devices 10, 10' and/or 10") can include both the device interface circuit 52 for non-deterministic communications (e.g., with the network manager device 24) and plural deterministic network interface circuits 22 for deterministic communications as described herein.

As described in further detail below, the device interface circuit 52 can include a ASIC 130 and a transmit buffer circuit 132.

Any one of the devices 10, 10', 10", 24, 28, and/or 38 also can be configured for a different type of deterministic link 18 or data link 56, as appropriate (e.g., a wired or wireless link, an optical link, etc.).

The processor circuit 12 can be configured for executing any of the operations described herein, and the memory circuit 54 can be configured for storing any data or data packets as described herein. For example, the processor circuit 12 and the memory circuit 54 implemented in the source host device 10, 10', 10" or the network manager device 24 can have a different implementation than the processor circuit 12 and memory circuit 54 implemented in any one of the deterministic network interface circuits 22, the TOR switching device 28, and/or the switching device 38. The processor circuit 12 can be implemented as any one of a microprocessor circuit, a multi-core processor circuit, an application-specific integrated circuit (ASIC), etc.

Any of the disclosed circuits of the devices 10, 10', 10", 24, 28, and/or 38 (including the device interface circuit 22 or 52, the processor circuit 12, the memory circuit 54, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as one or more application-specific integrated circuits (ASICs). Any of these circuits also can be implemented using a software-based executable resource that is loaded into the apparatus (e.g., via a device interface circuit such as an Ethernet connector, a Universal Serial Bus (USB) device, or some other machine-readable medium interface such as a CD-ROM drive) and executed by a corresponding internal processor circuit such as a microprocessor circuit (not shown) and implemented using one or more integrated circuits, where execution of executable code stored in an internal memory circuit (e.g., within the memory circuit 54) causes the integrated circuit(s) implementing the processor circuit to store application state variables in processor memory, creating an executable application resource (e.g., an application instance) that performs the operations of the circuit as described herein. For example, the memory circuit 54 can be configured for storing application state variables for a transport layer process 14, an executable application process 34, an operating system process 62, and/or a device manager process 64; in some cases certain processes can be combined, for example the transport layer process 14 and the device manager process 64 can be combined within the operating system process 62. Example data structures 66 stored in the memory circuit 54 can include the transport layer transmit buffer circuit 36 storing the transport layer packets 16 awaiting retrieval by the deterministic network interface circuits 22, a transport layer receive buffer circuit 68 configured for storing received transport layer packets 16 from a receiving deterministic network interface circuit 22 (e.g., 22*c*, 22*d*, 22*i*, 22*j*), an identified flow of application data 70 generated by the executable application 34, device manager parameters 72 including line card allocation parameters and associated deterministic constraints established for deterministic transmission by the deterministic network interface circuit 22a and/or 22b, etc.

Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 54 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 54 can be implemented dynamically by the processor circuit 12, for example based on memory address assignment and partitioning executed by the processor circuit 12.

Figure 4A:
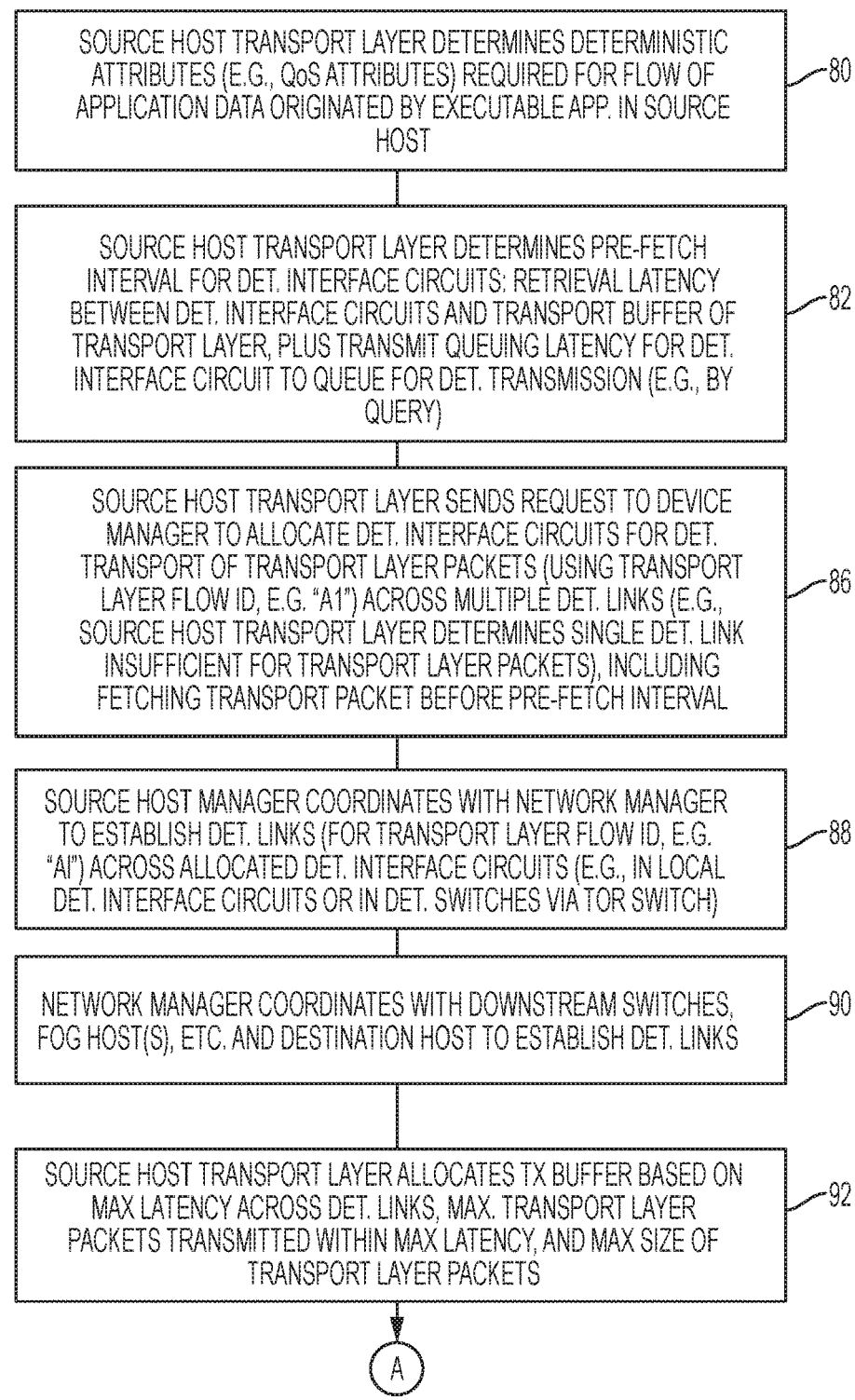
FIGS. 4A-4C illustrate an example method of a transport layer providing deterministic transport of transport layer packets across multiple deterministic links, according to an example embodiment.
Figure 4B:
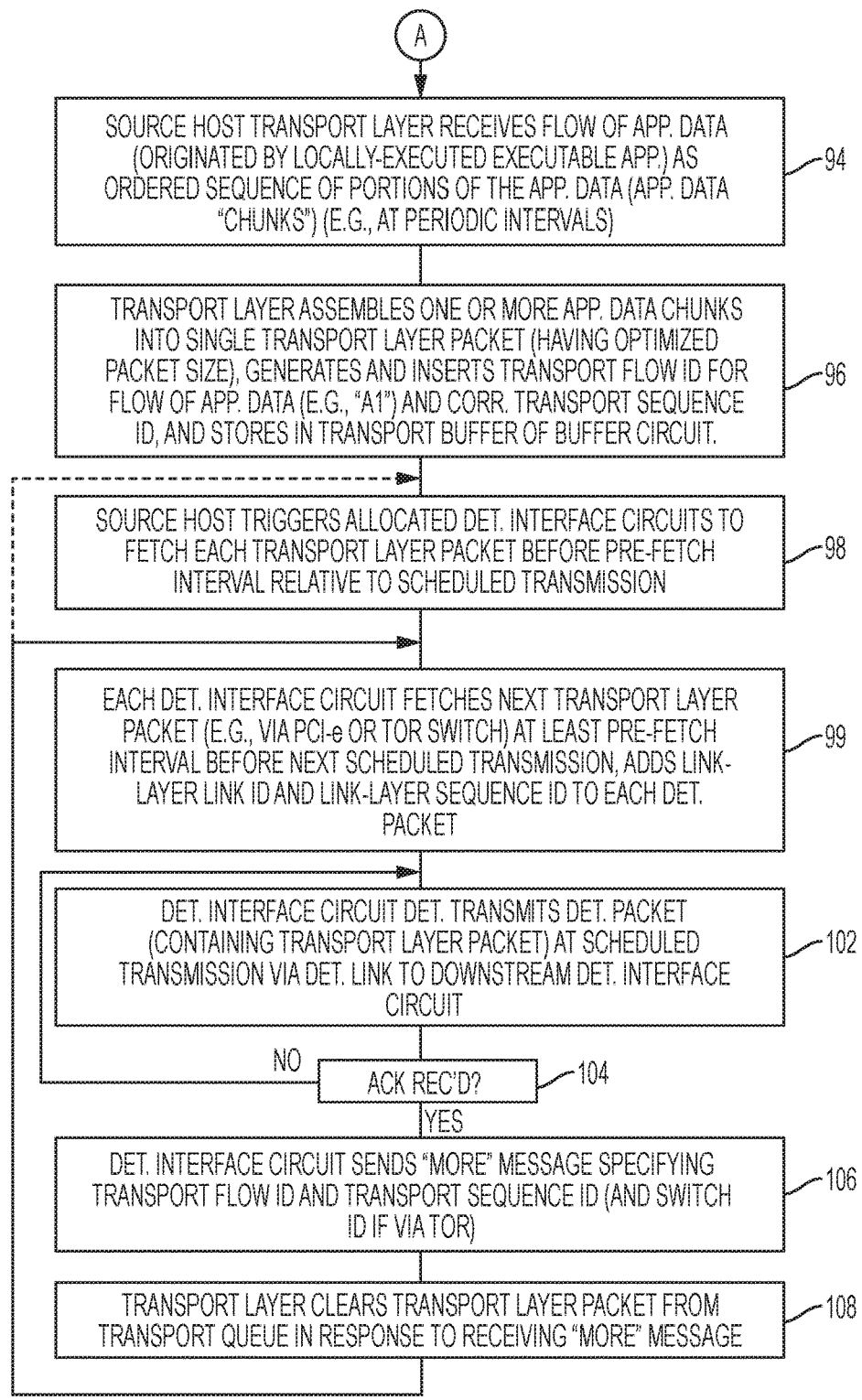
Figure 4C:
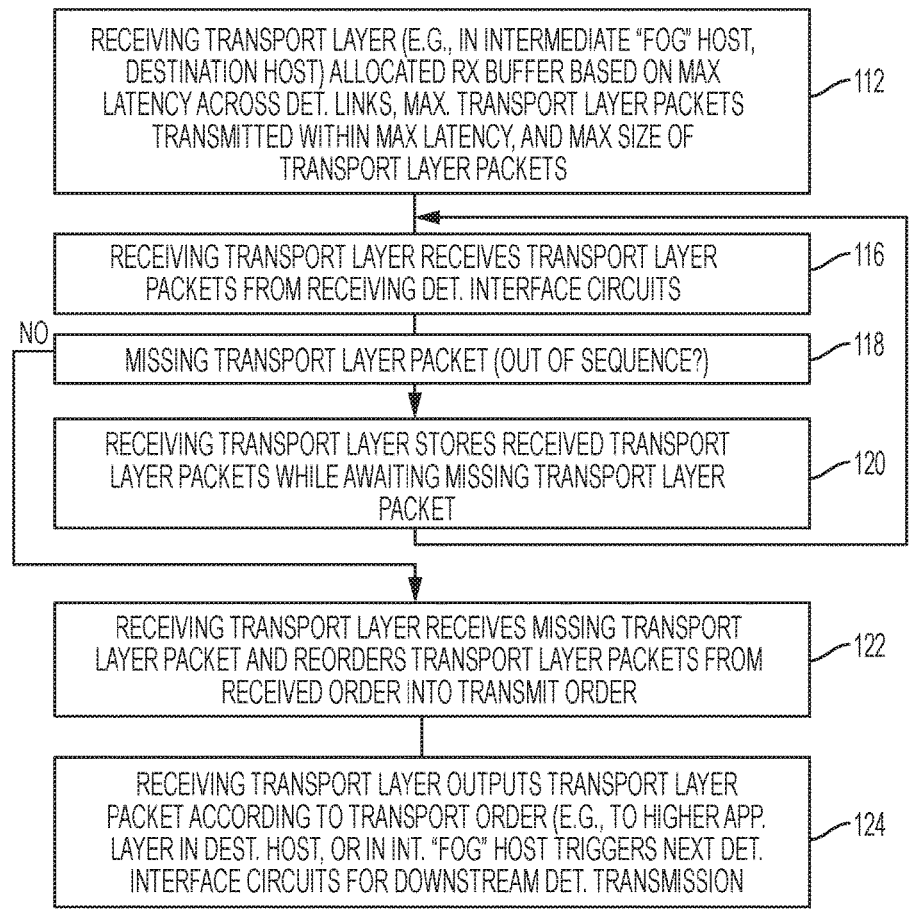

FIGS. 4A-4C illustrate an example method of a transport layer providing deterministic transport of transport layer packets across multiple deterministic links, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 12 executing the source host transport layer 14 in the source host device 10 is configured for determining in operation 80 the deterministic attributes and/or constraints that are required for an identified flow of application data 70 originated by the executable application 34 in the source host device 10. Example deterministic attributes can include identifying the destination host device 10' (e.g., by host name and/or Internet Protocol (IP) address, etc.), identifying a minimum Quality of Service (QoS) required for packet delivery at the destination host device 10', expressed for example as a prescribed minimum bandwidth, an overall jitter below a prescribed maximum jitter variation, a packet delivery ratio, a latency below a prescribed maximum latency, etc. The transport layer 14 (executed by the processor circuit 12 in the source host device 10) also can have access to available deterministic attributes of one or more deterministic links 18 established by a deterministic network interface circuit 22.

Figure 5:
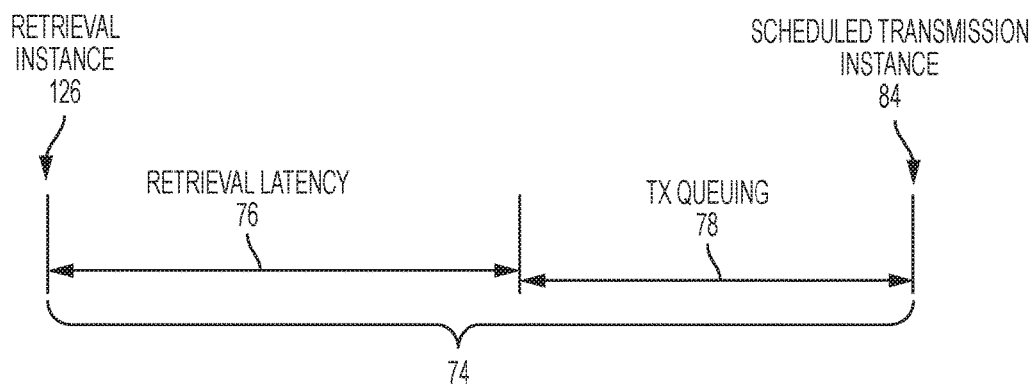
FIG. 5 illustrates an example pre-fetch interval, determined by the transport layer of FIGS. 1 and/or 2, for deterministic retrieval of each transport layer packet by a deterministic network interface circuit, according to an example embodiment.

The transport layer 14 (executed by the processor circuit 12 in the source host device 10) in operation 82 also can determine for each deterministic network interface circuit 22 a pre-fetch interval (74 of FIG. 5) for each deterministic network interface circuit 22 coupled to the source host device 10 for deterministic transmission of transport layer packets 16. As illustrated in FIG. 5, the transport layer 14 can determine a retrieval latency 76 for a corresponding deterministic network interface (e.g., 22a, 22b, 22e, and/or 220 to retrieve the corresponding transport layer packet 16 from the transport layer transmit buffer circuit 36, and a transmit queuing latency 78 for the corresponding deterministic network interface (e.g., 22a, 22b, 22e, and/or 22f) to queue the corresponding transport layer packet for the corresponding deterministic transmission at the scheduled transmission instance 84. The transport layer 14 can determine the transmit queuing latency 78, for example based on a query to the corresponding deterministic network interface circuit 22, and/or by accessing the pre-fetch interval 74 from the device manager parameters 72 stored in the local memory circuit 54.

Hence, the transport layer 14 (executed by the processor circuit 12 in the source host device 10) can cause each deterministic network interface circuit 22 associated with the source host device 10 to deterministically retrieve, at a corresponding retrieval instance 126, each transport layer packet 16 from the transport layer transmit buffer circuit 36 by the pre-fetch interval 74 preceding the corresponding deterministic transmission at the scheduled transmission instance 84, based on determining in operation 84 the corresponding pre-fetch interval 74, and sending in operation 86 a request to the device manager 64 to allocate a plurality of deterministic network interface circuits 22 (e.g., 22a and 22b, or 22e and 22f, etc.) for deterministic transport of the transport layer packets 16 (using the transport flow identifier "A1" 32) according to the deterministic attributes required for the identified flow of application data 70. As described below, each deterministic network interface circuit 22 can initiate retrieval of a transport layer packet by generating and outputting a "more" message 100 at the corresponding retrieval instance 126; in other words, each deterministic network interface circuit can define initiation of the next retrieval instance 126 by transmission of the "more" message 100. The "more" message 100 also is referred to herein as a request message.

The transport layer 14 in operation 86 also can determine that a single one of the deterministic links 18 has insufficient resources for deterministic transport of the transport layer packets 16 to the destination transport layer 14 (executed in the source host device 10 or the intermediate host device 10"), and in response the transport layer packet 16 can specify in the request to the device manager 64 that multiple deterministic network interface circuits 22 are required for the deterministic transport of the transport layer packets 16.

The device manager 64 executed by the processor circuit 12 in the source host device 10 (i.e., the source host manager) in operation 88 can coordinate with the network manager device 24 (and/or 24a and 24b of FIG. 2, as appropriate), for establishment of end-to-end deterministic links 18 for the transport layer packet 16 from the source host device 10 to the destination host device 10' via the deterministic data network 20 (or the deterministic data network 20' of FIG. 2). The network manager device 24 (and/or 24a and 24b of FIG. 2) in operation 90 can coordinate with the downstream switching devices 38, any intermediate host device 10" (as appropriate), and the destination host device 10', for establishment of the plural deterministic links 18 for end-to-end deterministic transmission via the deterministic links 18 of the transport layer packets 16 from the source host device 10 to the destination host device 10', according to the required deterministic constraints. For example, the network manager device 24a of FIG. 2 can send instructions to the deterministic network interface circuits 22e, 22g, and 22i for the establishment in the deterministic domain 26a of a first deterministic path (comprising "TSN link 1" 18 and "TSN link 1'" 18) having first deterministic constraints for the transport layer packets 16 having the transport flow identifier "A1" 32; the network manager device 24a of FIG. 2 also can send instructions to the deterministic network interface circuits 22f, 22h, and 22j for the establishment in the deterministic domain 26a of a second deterministic path (comprising "TSN link 2" 18 and "TSN link 2'" 18) having second different deterministic constraints for the transport layer packets 16 having the transport flow identifier "A1" 32. The network manager device 24a also can notify the intermediate host device 10" of the first and second deterministic paths for the transport layer packets 16 having the transport flow identifier "A1" 32. As apparent from the foregoing, the device manager 64 in the intermediate host device 10" can coordinate with the network manager device 24b to establish deterministic paths in the deterministic domain 26b; alternately, the network manager device 24a and network manager device 24b can communicate to establish the deterministic transport of the transport layer packets 16 across the respective deterministic domains 26a and 26b via the intermediate host device 10".

The network manager device 24 in operation 90 also can send an acknowledgement to the device manager 64 specifying the plural deterministic links 18 are established for the transport layer packets 16 identified by the transport sequence identifier "A1" 30, including for example for each identified deterministic network interface circuit 22 the prescribed transmission period of time "T", the maximum number of "N" data packets having a maximum size "F" that can be transmitted during the transmission time period "T", and the repeat interval for the repeating schedule. The device manager 64 executed in the source host device 10 can notify the transport layer 14 of the identified deterministic network interface circuits 22 and the supplied parameters (note that the transport layer 14 need not be aware of the actual scheduled starting transmission time "t_TSN" 84).

The transport layer 14 executed in the source host device 10 in operation 92 also can allocate the size of the transport layer transmit buffer circuit 36 in the memory circuit 54 based on determining the maximum latency interval (L_MAX) across the deterministic links 16 from the source host device 10 to the "next" transport host (e.g., the intermediate host device 10" or the destination host device 10'), the maximum number of transport layer packets 16 that can be transmitted within the maximum latency, and the maximum size "F" of the transport layer packets 16. The maximum latency interval (L_MAX) across the deterministic links refers to the maximum time interval that may be needed for the transport layer 14 in the destination host device 10' to recover if an out-of-sequence packet is lost during transmission, as the source transport layer 14 executed in the source host device 10 does not specifically control which transport layer packet 16 a deterministic network interface circuit 22 should retrieve from the transport layer transmit buffer circuit 36, nor does the source transport layer 14 specifically control the scheduled transmission 84 by the transmit/receive gate circuit 42 of a given deterministic network interface circuit 22. Hence, the maximum latency interval (L_MAX) refers to the maximum amount of time a transport layer 14 must store successive transport layer packets 16 (i.e., having adjacent transport sequence identifiers 30) in case the different transport layer packets 16 are out of order and an out-of-order transport layer packet 16 needs to be reordered and/or retransmitted (if permitted according to the link-layer protocol executed by the deterministic link 18).

As described in further detail below, in FIG. 1A the deterministic network interface circuit 22b deterministically retrieves the transport layer packet 16 having the transport sequence identifier "001" 30 and stores in its transmit/receive buffer circuit 40 to await deterministic transmission at its next scheduled transmission opportunity, and the deterministic network interface circuit 22a deterministically retrieves the transport layer packet 16 having the transport sequence identifier "002" 30; in FIG. 1B the deterministic network interface circuit 22a deterministically transmits at event "t=t1" 46b the link layer data packet 44a containing the transport layer packet 16 having the transport sequence identifier "002" 30 while the deterministic network interface circuit 22b waits for its next scheduled transmission opportunity (at event "t=t4" 46e of FIG. 1E) before it can transmit the transport layer packet 16 having the transport sequence identifier "001" 30; hence, the maximum latency interval (L_MAX) is the maximum time the transport layer 14 in the source host device 10 must wait before it can clear a retrieved transport layer 14 from its queue (L_MAX=t4-t0). Hence, the transport layer 14 in operation 92 can be configured for allocating the size of the transport layer transmit buffer circuit 36 in the memory circuit 54 based on determining the maximum latency interval (L_MAX) across all the allocated deterministic links 18 for the identified flow "A1" 32, the maximum number of transport layer packets 16 that can be transmitted across all the allocated deterministic links 18 during the maximum latency, and the maximum size "F" of the transport layer packets 16. Similar allocations can be performed by the transport layer 14 for the transport layer receive buffer circuit 68, described below, for storage of received transport layer packets 16 while awaiting other transport layer packets 16 for reordering into the proper transmit sequence according to the transport sequence identifier 30.

Referring to FIG. 4B, the transport layer 14 executed in the source host device 10 in operation 94 receives the flow of application data packets 70 originated by the executable application 34; for example, the transport layer 14 can receive an alert (e.g., metadata, a descriptor, etc.) indicating the storage of the identified flow of application data 70 by the executable application 34 in the memory circuit 54, enabling the transport layer 14 to fetch an ordered sequence of the portions of the application data (e.g., as application data "chunks") from the memory circuit 54. Alternately, the executable application 34 and/or the operating system 62 can supply the identified flow of application data 70 as a data flow to the transport layer 14, for example where the transport layer 14 is executed in a hardware circuit that is distinct from the executable application 34 (e.g., multi-core processor, distinct ASICs, etc.). The transport layer 14 can receive the identified flow of application data 70 as a block of stored application data, an application data burst, a steady stream of application data "chunks", etc. Hence, the transport layer 14 can receive the flow of application data 70 as a sequence of portions of the application data from the executable application 34 executed locally by the processor circuit 12.

The transport layer 14 executed in the source host device 10 in operation 96 is configured for assembling one or more application data chunks into a single transport layer packet 16 having an optimized packet size based on the maximum size "F" determined for the deterministic links 18. The transport layer 14 in operation 96 also can generate a transport flow identifier (e.g., "A1") 32 associated with the identified flow of application data 70, for example to distinguish from another application flow generated by the same executable application (e.g., for a different destination, different content type, different sensor source, etc.). The transport layer 14 in operation 96 also can maintain a sequence counter for the identified flow of application data "A1" 70 for tracking the sequence of the transport layer packets 16 to be transported across the deterministic links 18. The transport layer 14 in operation 96 inserts the transport flow identifier 32 and the corresponding transport sequence identifier 30 into the transport layer packet 16, and stores the generated transport layer packet 16 into the transport layer transmit buffer circuit 36. As described previously, the transport sequence identifier 30 enables a receiving transport layer 14 (e.g., executed in the destination host device 10' or an intermediate host device 10") to reorder any received transport layer packets 16 into the appropriate transmit order to correct any mis-ordering due to different transmission schedules, different latencies, link layer transmission parameters, etc., across the deterministic links 18.

The transport layer 14 executed in the source host device 10 in operation 98 optionally can send a trigger message to the allocated deterministic network interface circuits 22 (e.g., 22a, 22b of FIGS. 1A-1G; 22e, 22f of FIGS. 1H-1J and FIG. 2) indicating the availability of the transport layer packets 16 for the identified flow of application data. Each deterministic network interface circuit 22 can respond to the trigger message by deterministically retrieving a corresponding transport layer packet 16, in the transmit order, from the transport layer transmit buffer circuit 36 no later than the retrieval instance 126, i.e., initiating retrieval by at least the pre-fetch interval 74 before the next scheduled transmission instance 84 by the transmit/receive gate circuit 42 for the corresponding deterministic network interface circuit 22. Hence, any one or more of the operations 80, 82, 86, 88, 90, 92, 94, 96, and/or 98 by the transport layer 14 cause the deterministic network interface circuit 22 to deterministically retrieve the transport layer packets 16, in the transmit order, for deterministic transmission across the respective deterministic links 18.

Each deterministic network interface circuit 22 in operation 99 can deterministically fetch the next transport layer packet 16 by fetching the transport layer packet 16 by at least the pre-fetch interval 74 before the next scheduled transmission instance 84 based on generating and outputting a "more" message 100, described in further detail below with respect to FIG. 1B. As illustrated with respect to FIGS. 1A-1G, the deterministic network interface circuits 22a and 22b can fetch the next transport layer packet 14 via the system bus 58 (e.g., using the "more" message 100 for executing a memory-read operation from an identified location in the memory circuit 54; alternately with respect to FIGS. 1H-1J and FIG. 2, the deterministic network interface circuits 22e and 22f can fetch the next transport layer packet 16 via the TOR switching device 28 and the data link 56; the device interface circuit 52 executed in the source host device 10 of FIGS. 1H-1J and FIG. 2 can retrieve the next transport layer packet 16 from the transport layer transmit buffer circuit 36 on behalf of the deterministic network interface circuits 22e and 22f (e.g., the "more" message 100 requesting a remote memory read operation of the memory circuit 54 by the deterministic network interface circuits 22e and 22f, or the "more" message 100 requesting that the device interface circuit 52 and/or the processor circuit 12 fetches the next transport layer packet 16 as a message-initiated host transfer).

Hence, each "more" message 100 output by a deterministic network interface circuit 22 defines or establishes the next corresponding retrieval instance 126. The "more" message 100 can be implemented as one of a remote memory read request (enabling the deterministic network interface circuit 22 to directly fetch the next transport layer packet 16 from the transport layer transmit buffer circuit 36 in the memory circuit 54), and/or the "more" message 100 can be implemented as a message-initiated host transfer request that causes the device interface circuit 52/and/or the processor circuit 12 to fetch the next transport layer packet 16, from the transport layer transmit buffer circuit 36, on behalf of the deterministic network interface circuit 22; alternately, the message-initiated host transfer can include the transport layer 14 (executed by the processor circuit 12) storing in advance different transport layer packets 16 in a transport buffer circuit 132 in the device interface circuit 52, enabling the device interface circuit 52 to output the next transport layer packet 16, from its internal transmit buffer circuit 132, in response to a received "more" message 100 via the data link 56. As apparent from the foregoing, execution of the "more" message 100 at the retrieval instance 126 as a remote memory read request can minimize the retrieval latency 76 since the hardware associated with the deterministic network interface circuit 22 is used to access the memory circuit 54 of the source host device 10; execution of the "more" message 100 at the retrieval instance 126 as a message-initiated host transfer request may provide more security for the source host device 10 (by limiting access to the memory circuit 54), but can increase the retrieval latency 76 based on competing resource requirements in the processor circuit 12 and/or the device interface circuit 52.

Each deterministic network interface circuit 22 (e.g., 22a, 22b, 22e, 22f) in operation 99 also can add its own link-layer stream identifier 48 and link-layer sequence identifier 50 to each link layer data packet 44 prior to queuing in its corresponding transmit/receive buffer circuit 40. Hence, the transmit/receive gate circuit 42 in each deterministic network interface circuit 22 waits for its next corresponding scheduled transmission instance 84 before transmitting the link layer data packet 44 stored in its transmit/receive buffer circuit 40. As described previously, each scheduled transmission instance 84 is established by the network manager device 24 as part of the deterministic sequence of transmissions, for example according to TSN, AVB, DetNet, etc.

Figure 1B:
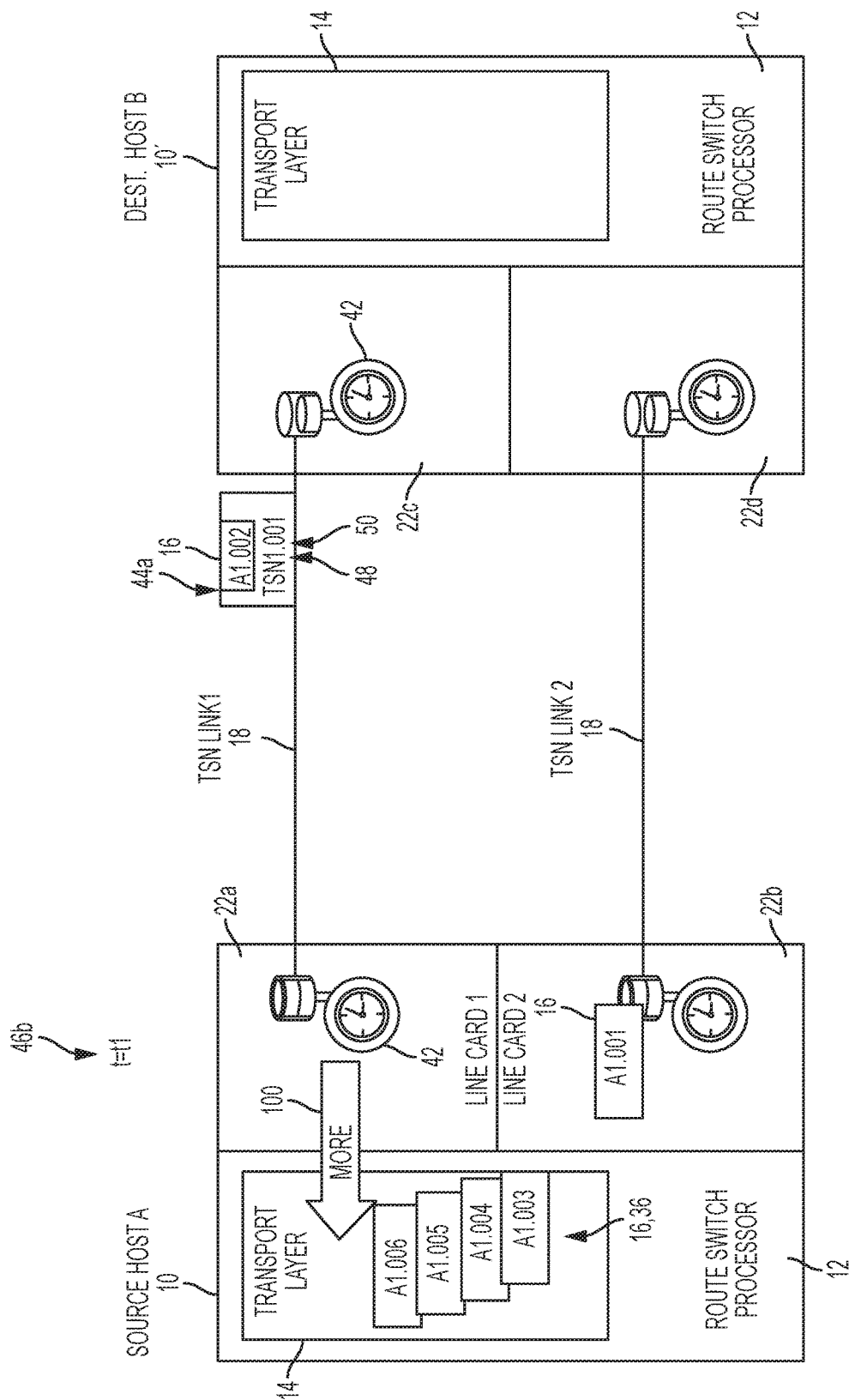
Figure 1C:
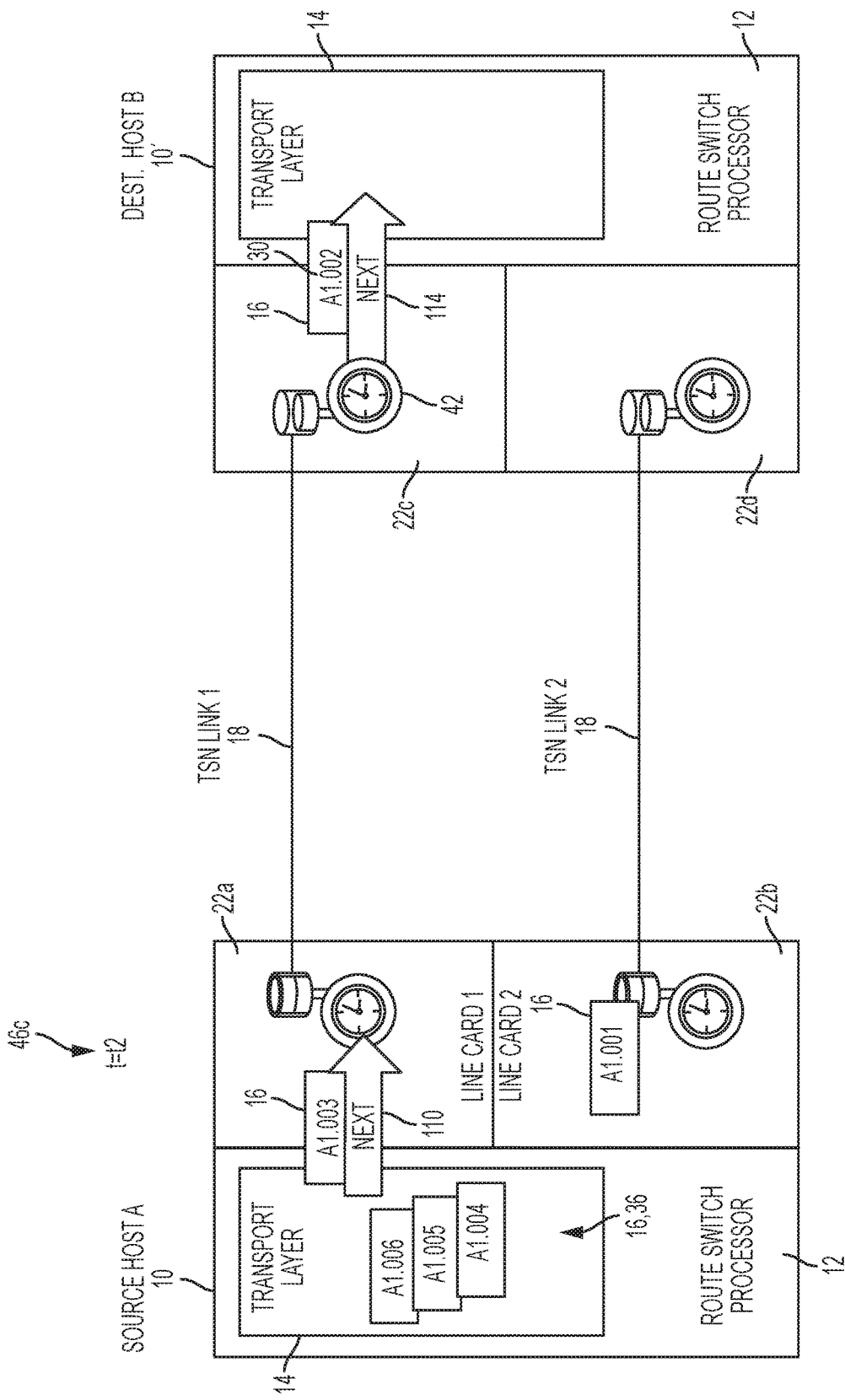
Figure 1D:
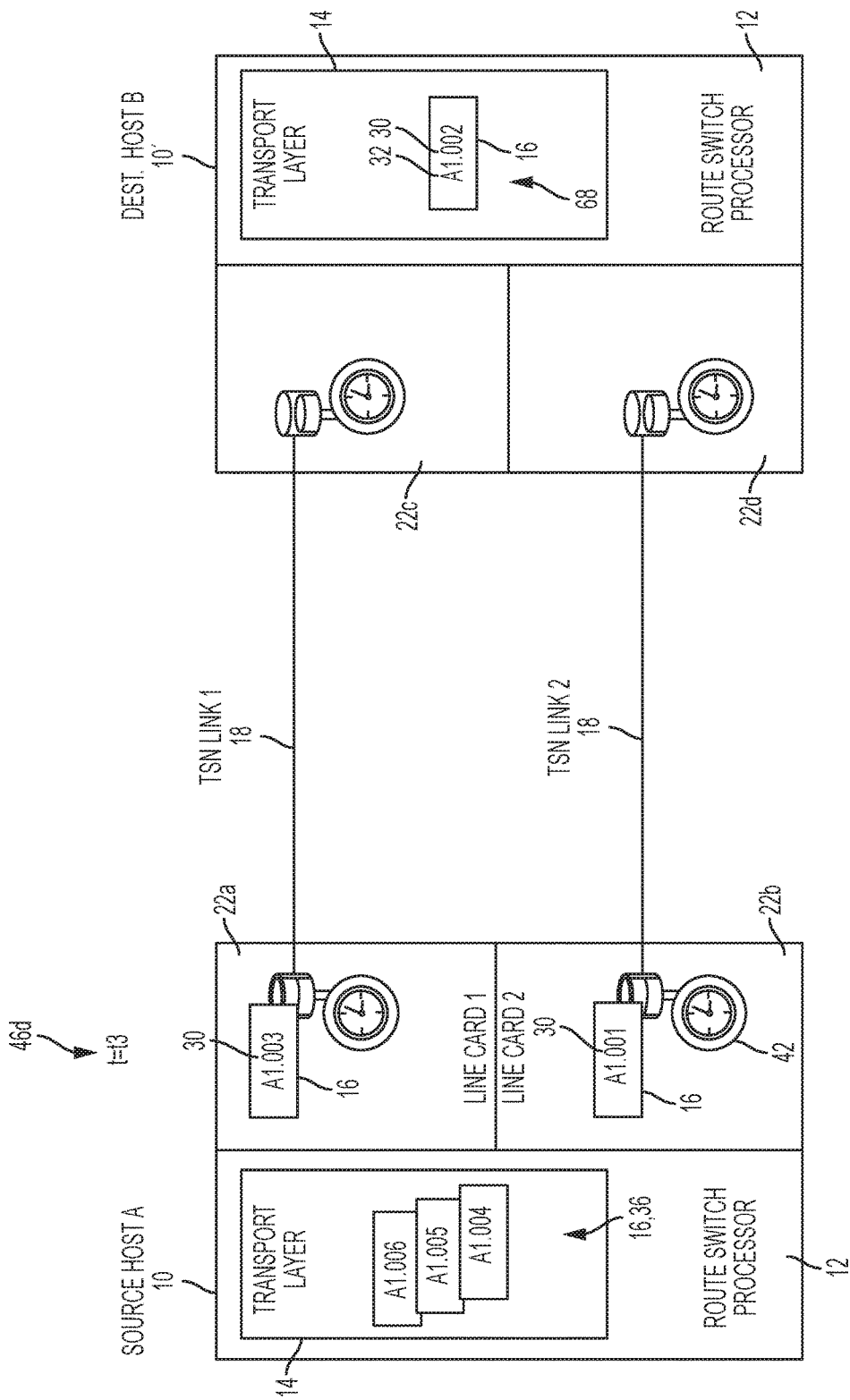
Figure 1E:
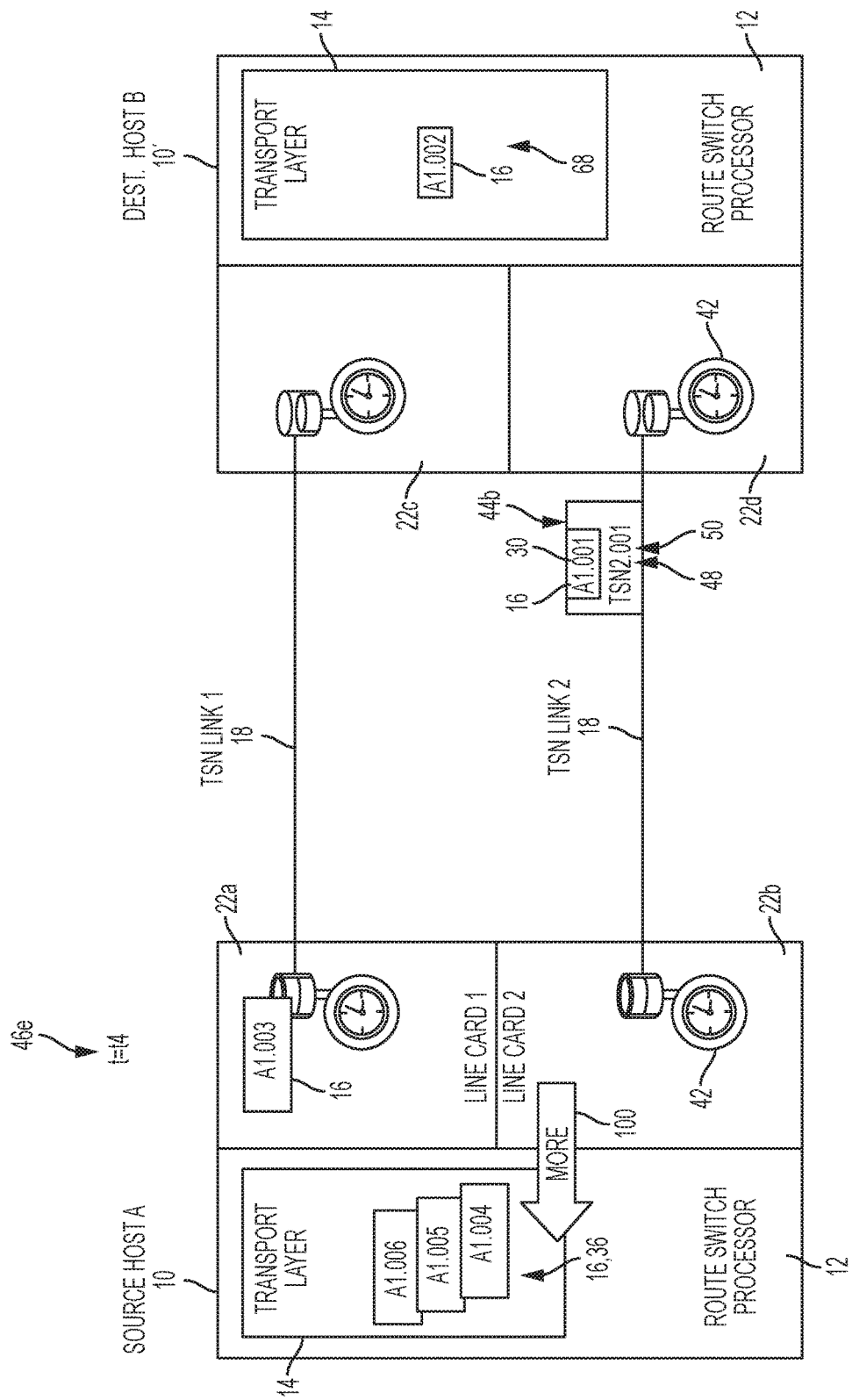
Figure 1F:
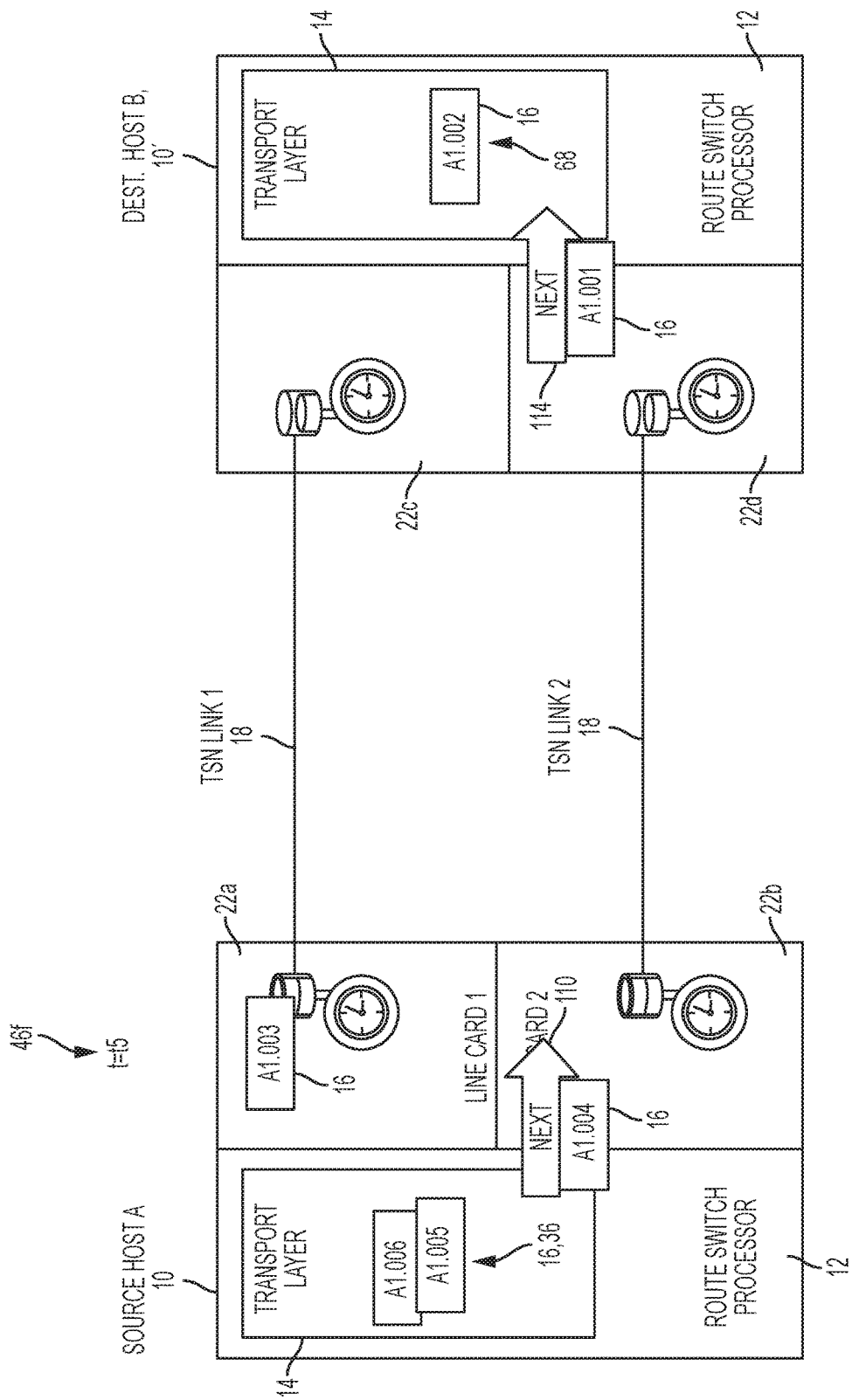
Figure 1G:
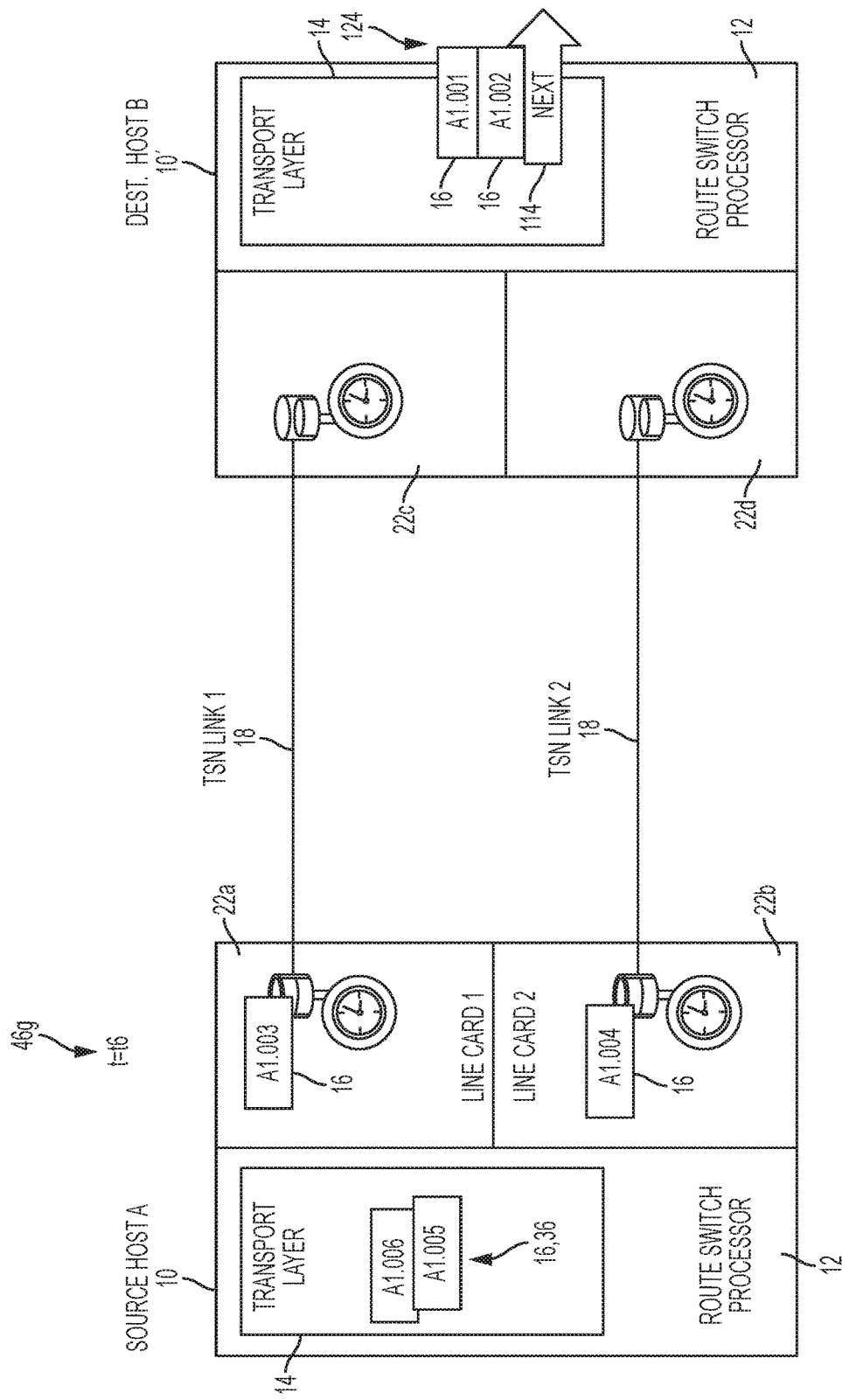
Figure 1H:
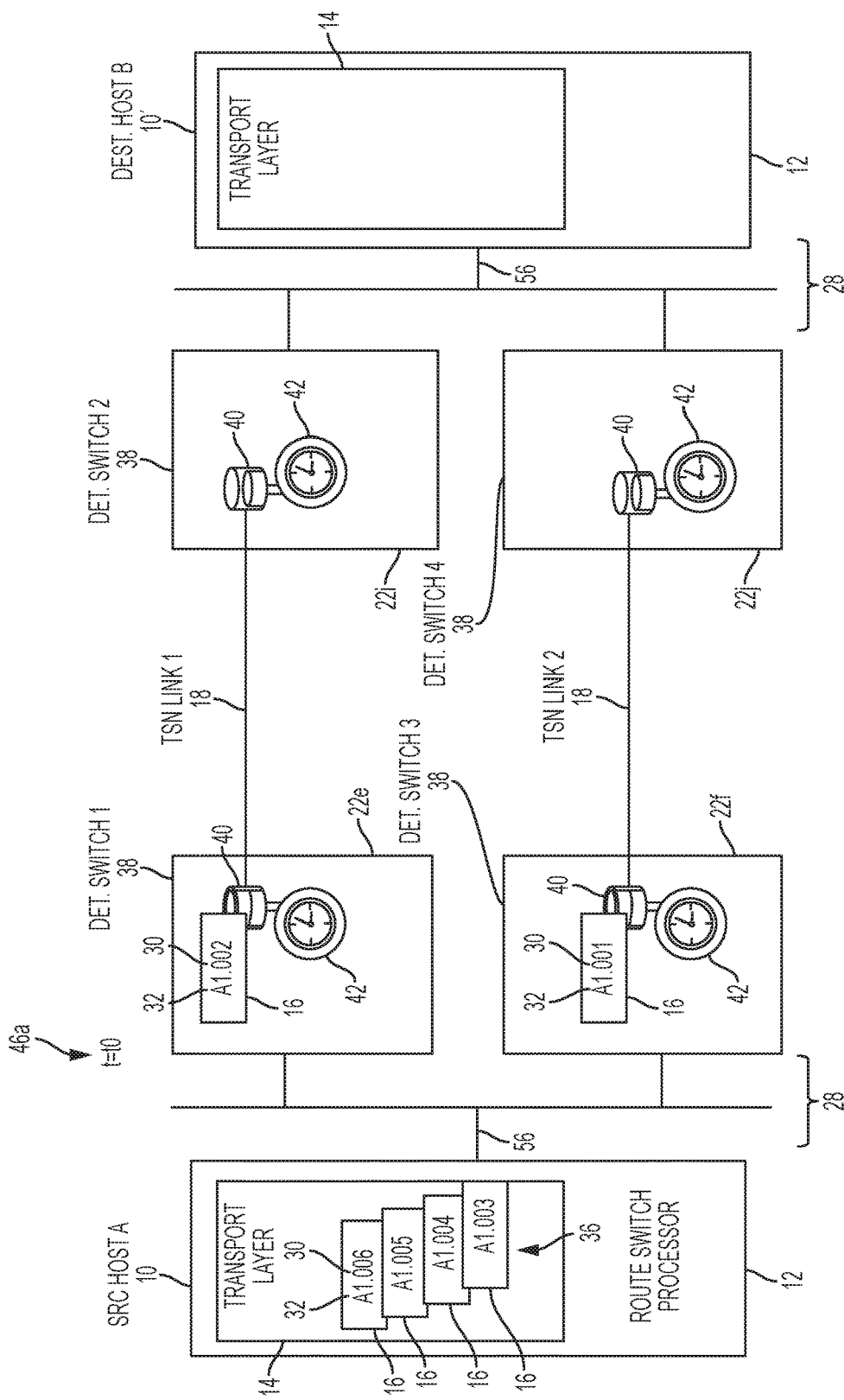
Figure 11:
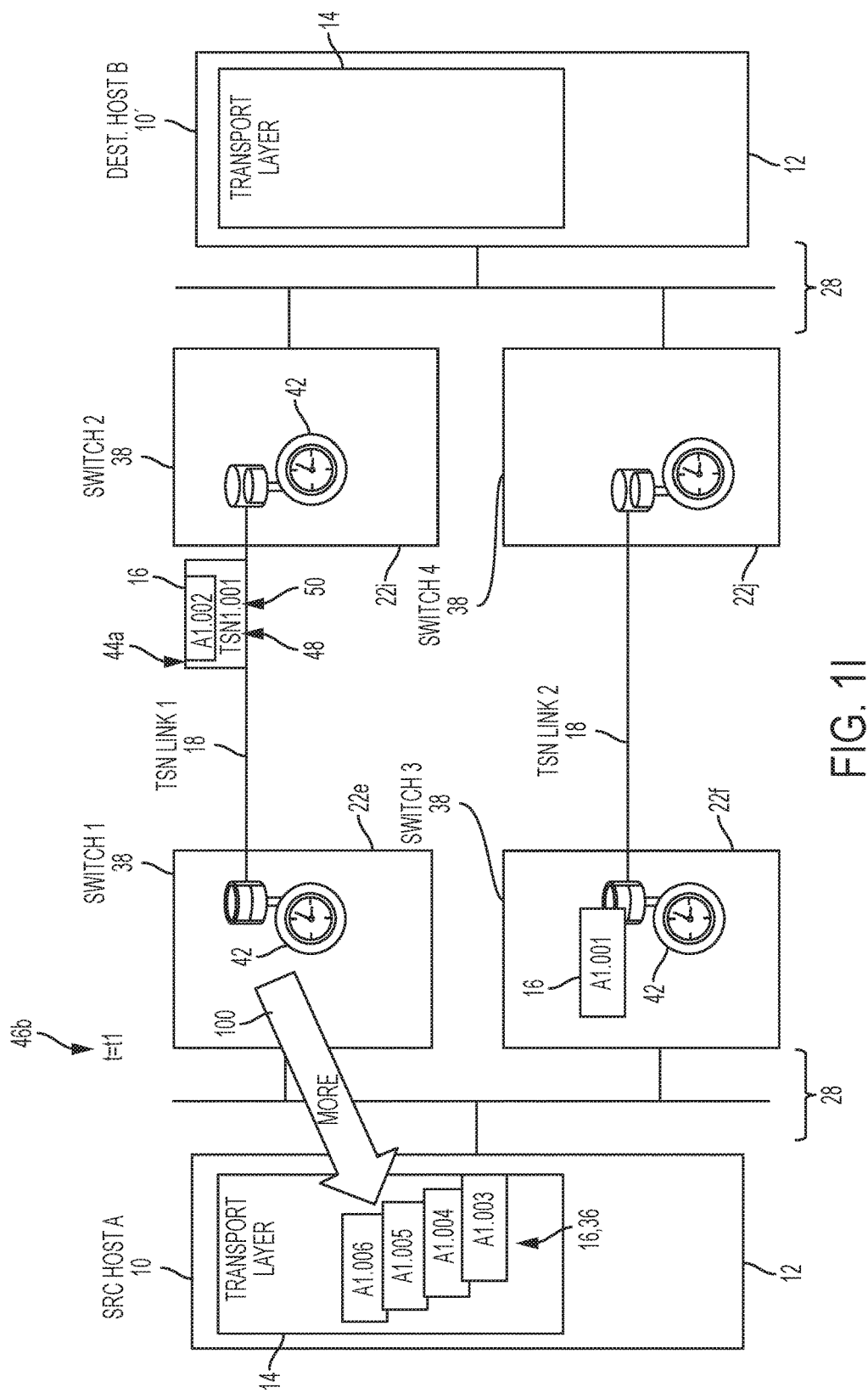

As illustrated in FIG. 1A and FIG. 1H, at event 46a at time t=t0 the deterministic network interface circuit 22a (or the deterministic network interface circuit 22e in FIG. 1H) stores the transport layer packet 16 having the transport sequence identifier "002" 30 in its corresponding transmit/receive buffer circuit 40, after the deterministic network interface circuit 22b (or the deterministic network interface circuit 22f in FIG. 1H) has previously stored the transport layer packet 16 having the transport sequence identifier "001" 30 in its corresponding transmit/receive buffer circuit 40. A deterministic network interface circuit 22 in operation 102 of FIG. 4B deterministically transmits its stored link layer data packet 44 (containing the transport layer packet 16) at the scheduled transmission instance 84 via the deterministic link 18 to its corresponding downstream deterministic network interface circuit 22. As illustrated in FIGS. 1B and 1I, at event 46b at time t=t1 (after event 46a) the transmit/receive gate circuit 42 of the deterministic network interface circuit 22a (or 22e) initiates its scheduled transmission 84 at its transmission instance of a link layer data packet 44a that contains the transport layer packet 16 having the transport sequence identifier "002" 30 and comprising a link-layer (e.g., TSN layer) stream identifier "TSN1" 48 and a link-layer sequence identifier "001" 50; the transmit/receive gate circuit 42 of the downstream peer deterministic network interface circuit 22c (or 22i) at event 46b at time t=t1 deterministically receives the link layer data packet 44a (within a prescribed deterministic latency) at its reception instance coinciding with the transmission instance, and in response to reception thereof sends an acknowledgement to the deterministic network interface circuit 22a (or 22e) that causes the deterministic network interface circuit 22a (or 22e) in operation 104 and 106 to send a "more message" 100 to the transmitting transport layer 14. As apparent from FIG. 1B, for example, the transport sequence identifier 30 (generated by the transport layer 14) is distinct from the link-layer sequence identifier 50 generated by the deterministic network interface circuit 22.

If in operation 104 the deterministic network interface circuit 22a (or 22e) does not receive the acknowledgement following transmission of the link layer data packet 44a, the deterministic network interface circuit 22a (or deterministic network interface circuit 22e) optionally can retransmit, as appropriate according to the deterministic constraints established by the network manager device 24 and the link-layer protocol in use (e.g., according to a wireless deterministic protocol such as 6TiSCH).

The deterministic network interface circuit 22a (or 22e) in operation 106 transmits a "more" message 100 that can specify the transport sequence identifier ".002" 30 (and optionally the transport flow identifier 32) of the transport layer packet 16, indicating successful deterministic transmission of the transport layer packet 16; the "more" message 100 optionally can specify a transmitter identifier (e.g., "Q1" for the deterministic network interface circuit 22a in FIG. 1B, "SW1" for the deterministic network interface circuit 22e in FIG. 1I). The "more" message 100 also can specify the associated deterministic constraints, for example the maximum packet size "F", and the maximum number of data packets "N" that can be transmitted on the corresponding deterministic link 18 within the period of time "T", enabling the retrieval of the next transport layer packet 16 having the correct packet size via remote memory read or message-initiated host transfer. The transport layer 14, in response to receiving in operation 108 the "more" message 100, can mark the associated transport layer packet 16 (having the identified transport sequence identifier ".002" 30 specified in the "more" message 100) as successfully transmitted and clear (i.e., discard) the transport layer packet 16 having the transport sequence identifier ".002" 30 from the transport layer transmit buffer circuit 36.

Figure 1J:
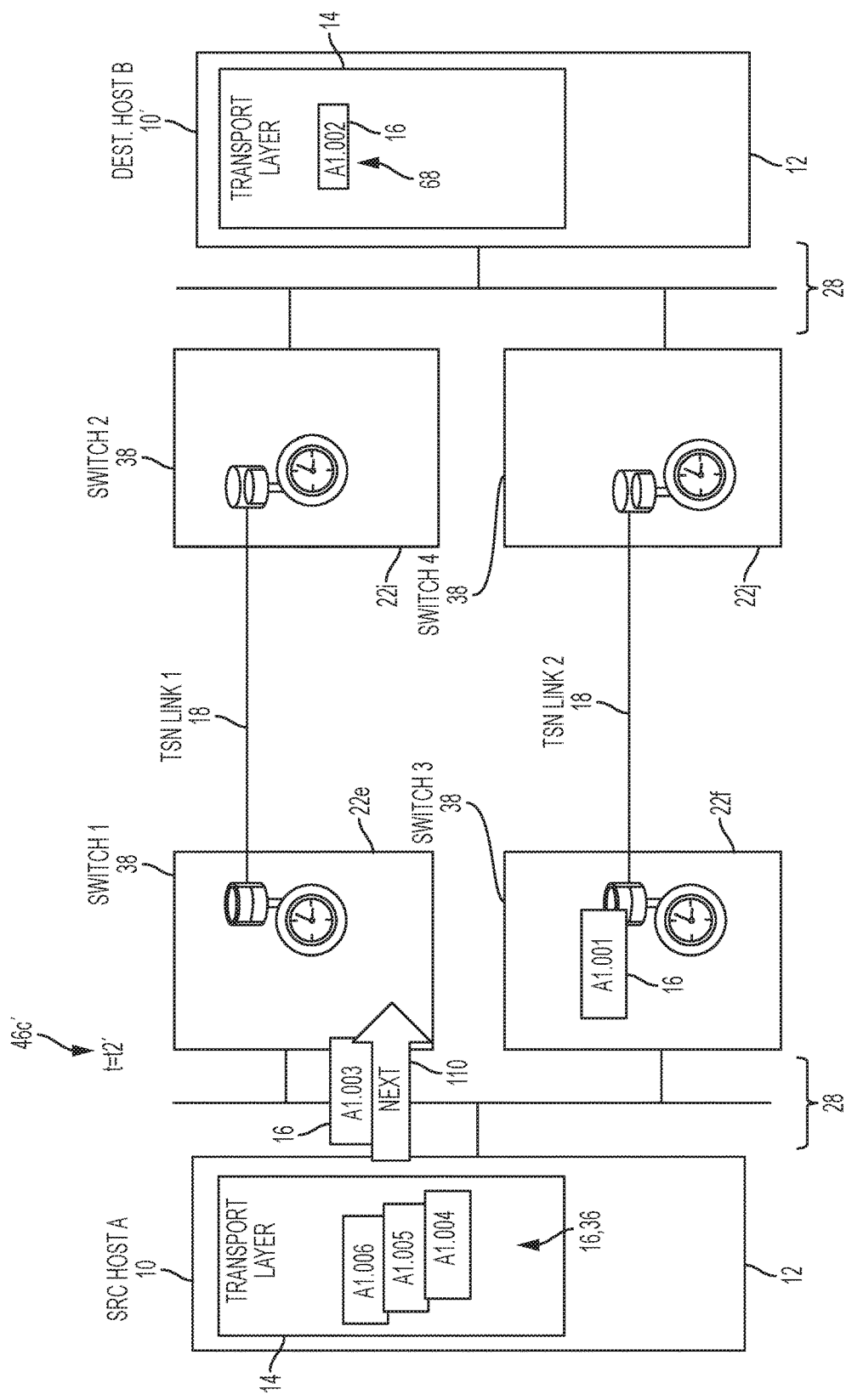

Referring to FIGS. 1C and 1J, at event "t=t2" 46c (or event "t=t2'" 46c' of FIG. 1J) (after event "t=t1" 46b) the deterministic network interface circuit 22a (or 22e), after having transmitted the "more" message 100, can repeat operations 100, 102, 104, and 106 for retrieval of the next transport layer packet 16 stored in the transport layer transmit buffer circuit 36 by at least pre-fetch interval 74 before the next scheduled transmission instance 84, namely the transport layer packet 16 having the transport sequence identifier ".003" 30; the deterministic network interface circuit 22a (or 22e) at event "t=t2" 46c (or event "t=t2'" 46c' of FIG. 1J) in operation 99 also can fetch transport message metadata 110 associated with the retrieved transport layer packet 16. In an alternate embodiment the transport layer 14 can repeat operation 98 in response to receiving the "more" message 100 in operation 108, in order to actively cause the deterministic network interface circuit 22a (or 22e) to retrieve the next transport layer packet 16 from the transport layer transmit buffer circuit 36; this alternate embodiment can be preferred to avoid buffer underflow where the deterministic network interface circuit 22 would attempt to access the transport layer transmit buffer circuit 36 if empty.

Referring to FIG. 4C, the destination transport layer 14 executed by the destination host device 10' (or the intermediate host device 10" in FIG. 2) in operation 112 can allocate its corresponding transport layer receive buffer circuit 68 based on the maximum latency expected across the deterministic links 18, as described previously with respect to operation 92. The destination transport layer 14 (based on coordinating with the network manager device 24 via the device manager 64) can allocate its corresponding transport layer receive buffer circuit 68 in its local device manager 64 based on determining the maximum latency interval (L_MAX) across all the allocated deterministic links 18 for the identified flow "A1" 32, the maximum number of transport layer packets 16 that can be transmitted across all the allocated deterministic links 18 during the maximum latency, and the maximum size "F" of the transport layer packets 16.

As described previously with respect to FIGS. 1B and 1I, the transmit/receive gate circuit 42 of the downstream peer deterministic network interface circuit 22c (or 22i) at event 46b at time t=1 deterministically receives the link layer data packet 44a (within a prescribed deterministic latency from the scheduled transmission instance 84), and in response the downstream peer deterministic network interface circuit 22c (or 22i) removes the link layer header (specifying the link-layer stream identifier 48 and the link-layer sequence identifier 50) and forwards the received transport layer packet 16 (specifying the transport sequence identifier "002" 30) to the transport layer 14, for example based on storing the received transport layer packet 16 in the transport layer receive buffer circuit 68 with receive message metadata 114 that notifies the receiving transport layer 14 of the received transport layer packet 16. Hence, the receiving transport layer 14 can respond to receiving the transport layer packet 16 in operation 116 by determining whether the corresponding transport sequence identifier 30 indicates the transport layer packet 16 is out-of-sequence, where the transport layer receive buffer circuit 68 is missing a transport layer packet 16 specifying a prior transport sequence identifier 30.

Similar to the transmitting transport layer 14 executed in the source host device 10, the receiving transport layer 14 executed in the intermediate host device 10" or the destination host device 10' can track the received transport sequence identifiers 30 for the transport layer packets 16 specifying the transport flow identifier "A1" 32. Hence, the receiving transport layer 14 can respond to the received transport layer packet 16 (specifying the transport sequence identifier "002" 30) by determining in operation 118 that it has not received a transport layer packet 16 specifying the preceding transport sequence identifier "001" 30. In response to detecting the absence of the missing transport layer packet, the receiving transport layer 14 in operation 120 can store the received transport layer packet 16 (specifying the transport sequence identifier "002" 30) in the transport layer receive buffer circuit 68 while awaiting the missing transport layer packet 16 specifying the transport sequence identifier "001" 30. As illustrated in FIG. 1D at event "t=t3" 46d (or event "t=t2'" 46c' of FIG. 1J) (after event "t=t2" 46c), the receiving transport layer 14 can store the received transport layer packet 16 (specifying the transport sequence identifier "002" 30) in its transport layer receive buffer circuit 68.

Referring to FIG. 1D, at event "t=t3" 46d the deterministic network interface circuit 22a is ready to transmit the transport layer packet 16 specifying the transport sequence identifier "003" 30, while the transmit/receive gate circuit 42 of the deterministic network interface circuit 22b is still waiting for its next scheduled transmission instance 84. The receiving transport layer 14 at event "t=t3" 46d continues to store in operation 120 the received transport layer packet 16 (specifying the transport sequence identifier "002" 30) in its transport layer receive buffer circuit 68.

Referring to FIG. 1E, at event "t=t4" 46e (after event "t=t3" 46d), the transmit/receive gate circuit 42 of the deterministic network interface circuit 22b (or 22O in operation 102 initiates its scheduled transmission 84 and deterministically transmits the link layer data packet 44b containing the transport layer packet 16 having the transport sequence identifier "001" 30, the link-layer stream identifier "TSN2" 48, and the link-layer sequence identifier "001" 50, according to the deterministic constraints established by the network manager device 24. The deterministic network interface circuit 22b (or 22f) in operation 106 transmits a "more" message 100 that can specify the transport sequence identifier ".001" 30 (and optionally the transport flow identifier 32) of the transport layer packet 16, indicating successful deterministic transmission of the transport layer packet 16. The transmitting transport layer 14, in response to receiving in operation 108 the "more" message 100, can mark the associated transport layer packet 16 (having the identified transport sequence identifier ".001" 30 specified in the "more" message 100) as transmitted, and clear (i.e., discard) from the transport layer transmit buffer circuit 36 the transport layer packet 16 having the transport sequence identifier ".001" 30.

The deterministic network interface circuit 22b (or 220, after having transmitted the "more" message 100, can repeat operations 100, 102, 104, and 106 for retrieval of the next transport layer packet 16 stored in the transport layer transmit buffer circuit 36 by at least the pre-fetch interval 74 before the next scheduled transmission instance 84, namely the transport layer packet 16 having the transport sequence identifier ".004" 30. Referring to FIG. 1F, the deterministic network interface circuit 22b (or 220 at event "t=t5" 46f in operation 99 also can fetch transport message metadata 110 associated with the retrieved transport layer packet 16 having the transport sequence identifier ".004" 30.

Referring to FIG. 1E, the transmit/receive gate circuit 42 of the downstream peer deterministic network interface circuit 22d (or 22j) deterministically receives the link layer data packet 44b (within a prescribed deterministic latency from the scheduled transmission instance 84 at event 46e), and in response the downstream peer deterministic network interface circuit 22d (or 22j) removes the link layer header and forwards the received transport layer packet 16 (specifying the transport sequence identifier "001" 30) to the transport layer 14.

As illustrated in FIG. 1F, at event "t=t5" 46f the receiving transport layer 14 receives in operation 116 the transport layer packet 16 (specifying the transport sequence identifier "001" 30), and associated receive message metadata 114, and the receiving transport layer 14 in operation 118 determines reception of the "missing" transport layer packet 116 (specifying the transport sequence identifier "001" 30). Hence, the receiving transport layer 14 in operation 122 can receive the "missing" transport layer packet 116 (specifying the transport sequence identifier "001" 30) and reorder the received transport layer packets 16 from the received order (e.g., "002", "001"), into the transmit order (e.g., "001", "002").

In response to reordering the received transport layer packets 16 in operation 122, the receiving transport layer 14 can output the transport layer packet 16 in the transmit order in operation 124, illustrated at event "t=t6" 46g in FIG. 1G. In the case of the destination host device 10', the destination transport layer 14 can forward the received transport layer packet 16, in the transport order, to a higher layer application such as the executable application 34 for delivery of the recovered identified flow of application data 70; in the case of an intermediate host device 10", the transport layer 14 executed in the intermediate "fog" host device 10" can cause the next deterministic interface circuits (e.g., 22k, 22l, 22m) in operation 98 to deterministically retrieve the transport layer packets 16 for the next deterministic domain 26b.

According to example embodiments, a unique interface can be established between an executable application in a host device and deterministic network interface devices in a deterministic network, without the necessity of the executable application being aware of the deterministic network. The example embodiments provide a transport layer that can be installed in any host device and that can ensure transport layer data packets (and above) can be recovered following transmission via one or more deterministic networks, even if the transport layer packets encounter reordering due to mismatched latencies or unsynchronized portions between the source application host (executed in the source host device) and the destination application host (executed in the destination host device).

The example embodiments also enable a transport layer to identify changes in the QoS requirements of the executable application, or increases in latency encountered within the transport and/or receive transport layer buffers, and respond accordingly. For example a source transport layer can recalculate the required deterministic data links that are required for the changed QoS requirements, and update the network manager (to increase or decrease the number of allocated deterministic links) and change the transmit and/or receive transport layer buffers, accordingly. Hence, the example embodiments enable a transport layer to acquire additional deterministic data links in response to detected increases in latency, or release excess deterministic data links if the QoS requirements of the executable application are reduced.

Transport Layer Identifying Failure Cause and Mitigation for Deterministic Transport Across Deterministic Links In addition to the foregoing, particular embodiments enable the transport layer to identify a failure cause in a missed transmission opportunity by one of the deterministic network interface circuits, where the one deterministic network interface circuit fails to transmit, at a scheduled transmission instance, one of the transport layer packets. One cause of a missed transmission opportunity can be a failed transfer of transport layer packet output from the apparatus executing the transport layer (also referred to as a "host device") to the one deterministic interface circuit, for example due to loss of the transport layer packet between the host device and the one deterministic interface circuit; another example of a failed transfer of the transport layer packet output from the host device to the one deterministic interface circuit can be that the transport layer packet fails to arrive at the one deterministic interface circuit before a scheduled transmission instance on the deterministic link.

Another cause of a missed transmission opportunity can be the host device failing to receive, from the one deterministic interface circuit, a request message for one of the transport layer packets; since the host device can be configured to rely on the request message to provide precise transfer of a transport layer packet to the one deterministic interface circuit for deterministic transmission at the scheduled transmission instance, the failure to receive the request message can results in the transport layer packet remaining stored in the host device (awaiting the next request message from one of the deterministic interface circuits). Hence, failure to de-queue the transport layer can cause an accumulation in the host device of the transport layer packets, resulting in a "backlog" or increase in latency of the transport packets awaiting deterministic transmission among the deterministic network interface circuits.

Hence, example embodiments enable the transport layer, executed in the host device, to determine a cause of failure in a missed transmission opportunity (detected from a request message), and selectively execute a corrective action for preventing an increase in latency of the transport layer packets awaiting transfer for deterministic transmission among the deterministic network interface circuits.

Hence, example embodiments enable the transport layer 14 to identify or determine a cause of failure in a missed transmission opportunity by a deterministic network interface circuit 22, and execute mitigation to ensure continued deterministic transport of transport layer data packets 16 across the multiple deterministic links 18, for example based on selectively executing a corrective action that prevents an increase in latency of the transport layer packets 16 awaiting transfer to the deterministic network interface circuits 22.

As described previously with respect to FIGS. 1H-1J and FIG. 2, the deterministic transport of the transport layer packets 16 across the deterministic link 18 assumes: (1) the source host device 10 receives each "more" message 100 from a deterministic network interface circuit 22 via a data link 56 by at least the pre-fetch interval 74 before the corresponding scheduled transmission instance 84 (as in FIG. 1I); the (2) source host device 10 can successfully transfer a transport layer packet 16 to the deterministic network interface circuit 22 via the data link 56 (as in FIG. 1J); (3) the transport layer packet 16 is successfully transferred to the deterministic network interface circuit 22 before the expiration of the retrieval latency 76, enabling the deterministic network interface circuit 22 to queue the received transport layer packet 16 within the transmit queuing latency 78 for deterministic transmission by the scheduled transmission instance 84. A failure in any one of these three assumptions can result in a missed transmission opportunity on the corresponding deterministic link 18.

In one embodiment, if a deterministic network interface circuit 22 having transmitted a "more" message 100 fails to receive a transport layer packet 16 responsive to the "more" message 100 before the initiation of the transmit queuing latency 78 (i.e., too late for the scheduled transmission instance 84), or fails to receive the transport layer packet 16 at all, the deterministic network interface circuit 22 can generate (within the transmit queuing latency 78) and transmit at the scheduled transmission instance 84 a management message (e.g., an Operations, Administration and Management (OAM) frame) in place of the transport layer packet 16. Hence, the deterministic network interface circuit 22 can exploit the otherwise-missed transmission opportunity by sending an OAM frame to the next-hop transport layer (executed in the intermediate host device 10" or the destination host device 10'). The deterministic network interface circuit 22 can mark the OAM frame as discard-eligible, enabling the next-hop transport layer to respond to the missed transmission opportunity for a transport layer packet 16 (i.e., a missed transport layer packet 16) by executing error correction to recover the missed transport layer packet 16 using a coded packet, described below, reporting the missed transport layer packet 16 to a network manager device 24, and discarding the discard-eligible OAM frame.

If the source host device 10 (or intermediate host device 10") fails to receive a "more" message 100 from any one deterministic network interface circuit 22 for a corresponding scheduled transmission instance 84, the failure to receive a "more" message 100 can cause a corresponding failure in de-queuing one of the transport layer packets 16 from the transport layer transmit buffer circuit 36: the failure in de-queuing a transport layer packet 16 from the transport layer transmit buffer circuit 36 can create a "backlog" in the transport layer packets 16 following the one transport layer packet 16 that was not de-queued due to the lost "more" message 100.

According to example embodiments, the transport layer 14 can determine, from a "more" message 100 specifying any missed transmission opportunities by the deterministic network interface circuit 22 on the corresponding deterministic link 18, a cause of failure in one or more of the missed transmission opportunities, and selectively execute a corrective action for preventing an increase in latency of the transport layer packets 16 among the deterministic network interface circuits 22. As described below, the transport layer 14 is configured for selectively executing the corrective action based on marking selected transport layer packets 16 in the transport layer transmit buffer circuit 36 as discard-eligible (but not any coded packets), and sending a discard signal to the device interface circuit 52 in response to determining the cause of failure is a failed reception of a "more" message 100 previously transmitted by the deterministic network interface circuit 22. The device interface circuit 52 further is configured (e.g., by an ASIC 130 executed in the device interface circuit 52) for discarding from its internal transmit buffer circuit 132, in response to the discard signal, one of the discard-eligible transport layer packets having been retrieved by the device interface circuit 52 from the transport layer transmit buffer circuit 36, the discarding prior to transfer via the non-deterministic data link 56 to the one deterministic network interface circuit 22 in response to the "more" message 100.

Figure 6A:
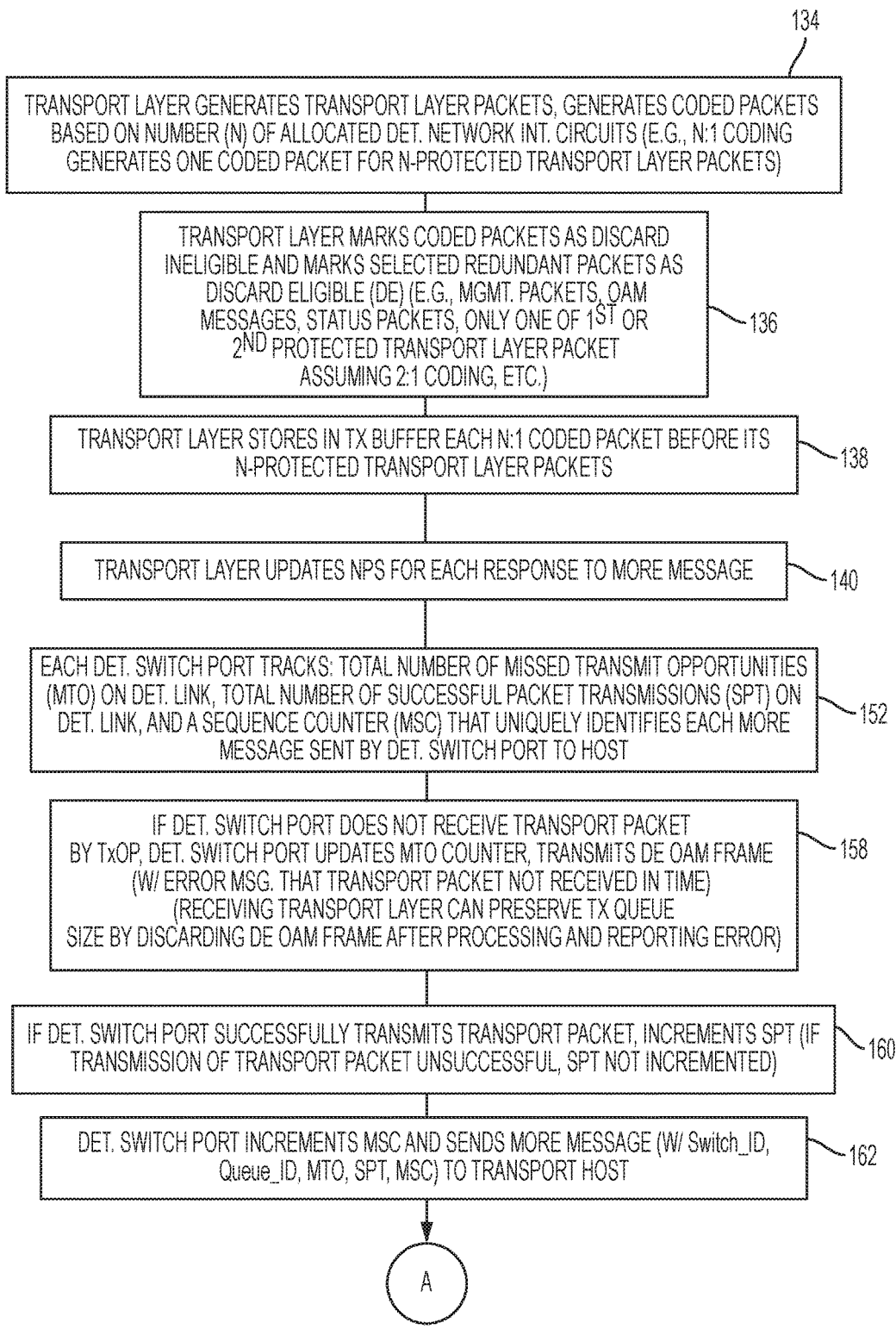
FIGS. 6A and 6B illustrate an example method of identifying a failure case in a missed transmission opportunity, and mitigating against the failure to ensure deterministic transport across the multiple deterministic data links, according to an example embodiment.
Figure 6B:
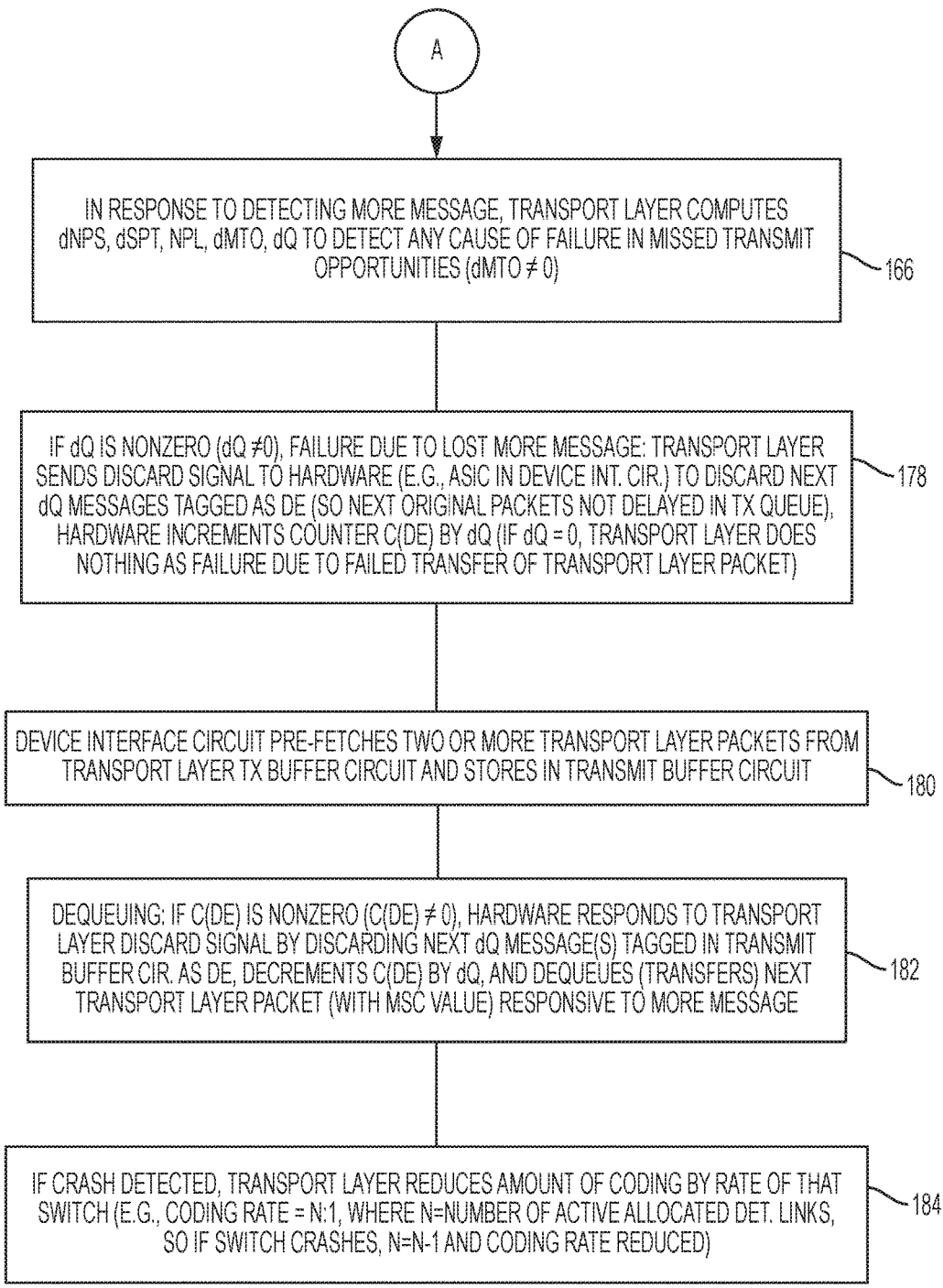
Figure 7:
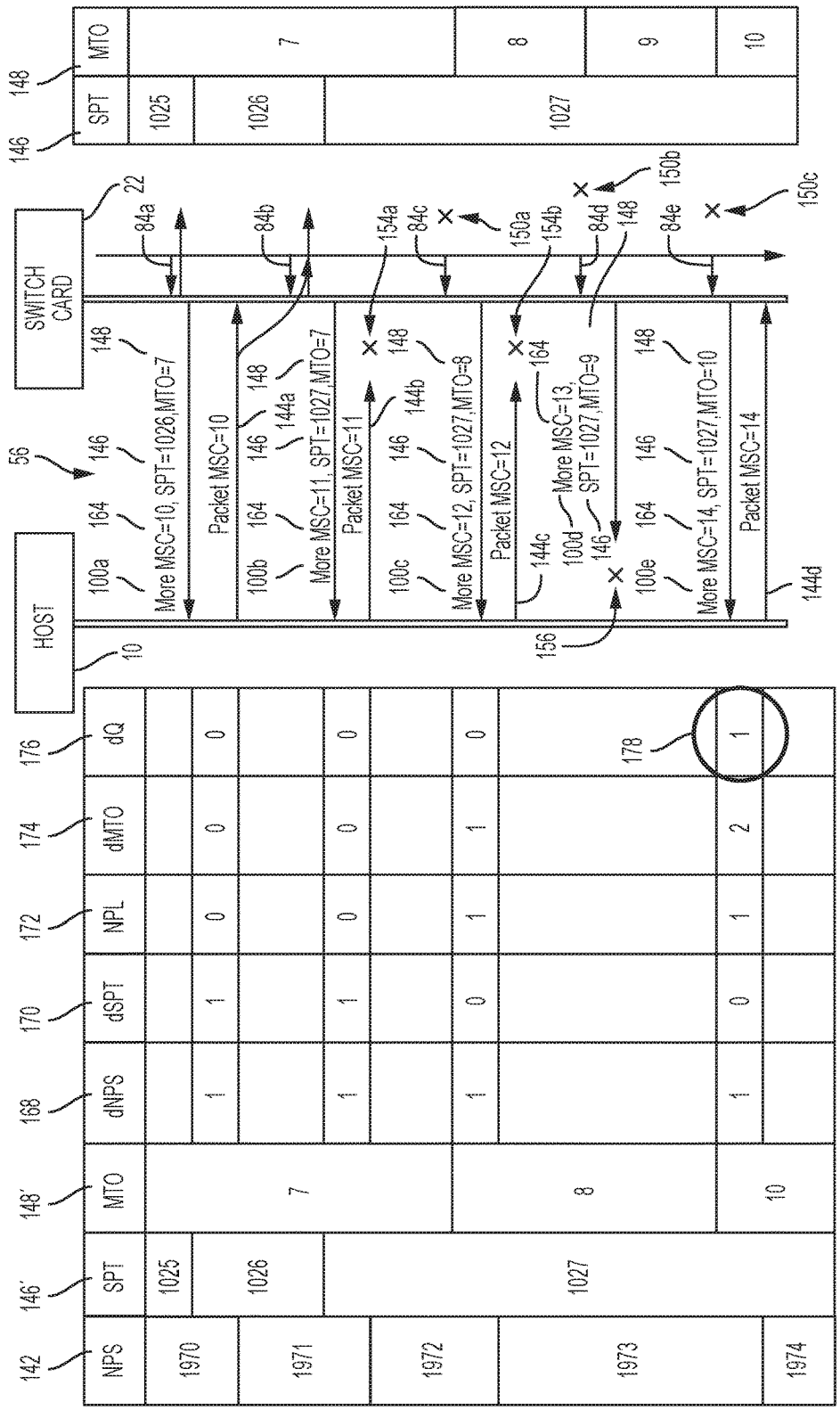
FIG. 7 illustrates an example diagram of the transport layer in a host device and a deterministic network interface circuit executing mitigation against a missed transmission opportunity, according to an example embodiment.

FIGS. 6A and 6B illustrate an example method of identifying a failure cause in a missed transmission opportunity, and mitigating against the failure to ensure deterministic transport across the multiple deterministic data links, according to an example embodiment. FIG. 7 illustrates an example diagram of the transport layer in a host device and a deterministic network interface circuit executing mitigation against a missed transmission opportunity, according to an example embodiment. The operations of FIGS. 6A, 6B, and 7 can be executed by the transport layer 14 executed in any one of the source host device 10 and/or the intermediate host device 10", and the associated deterministic network interface circuits 22 providing the respective deterministic links 18 for the deterministic transport of the transport layer packets 16 supplied by the transport layer 14.

Referring to FIG. 6A, the processor circuit 12 executing the transport layer 14 in operation 134 can generate the transport layer packets 16 as described previously with respect to operation 96, except that the transport layer 14 also can generate the coded packets (illustrated in FIG. 2 as "A1.C1", "A1.C2", "A1.C3", "A1.C4", etc.) according to a coding ratio that is based on a number "N" of allocated deterministic network interface circuits 22. For example, if the transport flow "A1" is allocated four (4) deterministic network interface circuits 22 via respective switching devices 38 (N=4), the transport layer packet 16 can generate the coded packets according to a 4:1 coding ratio (N:1). As described below, the transport layer 14 can reduce the coding ratio (N:1) in response to determining a failure in one of the deterministic network interface circuits 22 and reducing the corresponding number (N=N−1) of allocated deterministic network interface circuits 22.

The transport layer 14 in operation 136 adds to each packet stored in the transport layer transmit buffer circuit 36 a "tag" or "flag" that identifies to the ASIC 130 in the device interface circuit 52 whether the corresponding packet is discard-eligible. In particular, ASIC 130 can pre-fetch one or more transport layer packets 16 for storage in the transmit buffer circuit 132 in anticipation of the next "more" message 100 from a deterministic network interface circuit 22. The marking of a redundant packet as discard-eligible by the transport layer 14 in the transport layer transmit buffer circuit 36 enables the ASIC 130 in the device interface circuit 52, having pre-fetched the redundant packet from the transport layer transmit buffer circuit 36 into the transmit buffer circuit 132, to "flush" the redundant packet from the transmit buffer circuit 132 in response to a discard signal from the transport layer 14, and respond to a "more" message 100 by transferring the next available packet stored in the transmit buffer circuit 132.

Hence, the transport layer 14 in operation 136 marks each coded packet (e.g., "A1.C1", "A1.C2", "A1.C3", "A1.C4", etc.) as discard-ineligible (DE=0), and marks each redundant packet in the transport layer transmit buffer circuit 36 as discard eligible (DE=1). Examples of a redundant packet in the transport layer transmit buffer circuit 36 can include a management packet, an OAM message, a status packet, and the like. Another example of a redundant packet can be at least one of the N-protected transport layer packets that can be recovered from the corresponding coded packet and the remaining N-protected transport layer packets: for example, if N=2, then only one of the first or second protected transport layer packets used to generate the 2:1 coded packet can be marked as discard-eligible in order to enable recovery of the discarded packet by the receiving transport layer 14 (e.g., in the destination host device 10').

The transport layer 14 in operation 138 stores in the transport layer transmit buffer circuit 36 the discard-ineligible coded packet for transfer to a deterministic network interface circuit 22 by the device interface circuit 52 (in response to a received "more" message 100) before any one of the N-protected packets associated with the coded packet. Hence, the receiving transport layer 14 can recover any discarded N-protected packet based on the coded packet and the remaining N-protected packets.

FIG. 7 illustrates an example diagram of the transport layer 14 in a host device (e.g., 10 or 10") and a deterministic network interface circuit 22 executing mitigation against a missed transmission opportunity. The operations of FIG. 7 are for a single deterministic network interface circuit 22; hence, the operations of FIG. 7 are repeated for each deterministic network interface circuit 22 allocated to the transport layer 14 for an identified flow.

As described below, the transport layer 14 can determine a cause of failure in a missed transmission opportunity in a deterministic network interface circuit 22 based on updating in operation 140 a number of packets sent (NPS) counter 142 for each patent transfer (e.g., 144a, 144b, 144c, 144d of FIG. 7) executed by the device interface circuit 52 in response to a "more" message 100, and based on comparing changes, between successively-received "more" messages (e.g., 100a and 100b; 100b and 100c; and 100c and 100e) in the NPS counter 142 to changes in a successful packet transmission (SPT) counter value 146 and a missed transmission opportunity (MTO) counter value 148 maintained by the deterministic network interface circuit 22.

In particular, each deterministic network interface circuit 22 tracks the total number of missed transmit opportunities (e.g., 150a at scheduled transmission instance 84c, 150b at scheduled transmission instance 84d, and 150c at scheduled transmission instance 84e) by incrementing its MTO counter value 148 in response to each missed transmit opportunity 150 in operation 152. As illustrated in FIG. 7, the deterministic network interface circuit 22 (e.g., deterministic network interface circuit 22e of FIGS. 1H-1J) in operation 152 of FIG. 6A can increment its SPT counter value 146 in response to successful transmission of a link layer data packet 44 on its deterministic link 18 at a corresponding scheduled transmission instance 84 (e.g., at scheduled transmission instance 84a and scheduled transmission instance 84b); in contrast, the deterministic network interface circuit 22 in operation 152 can increment its MTO counter value 148 in response to each missed transmit opportunity 150, namely the missed transmit opportunity 150a at the scheduled transmission instance 84c, the missed transmit opportunity 150b at the scheduled transmission instance 84d, and the missed transmit opportunity 150c at the scheduled transmission instance 84e. As illustrated in FIG. 7, the missed transmit opportunity 150a is caused by the failed transfer 154a of a packet (e.g., a transport layer packet 16, a coded packet, a management packet, etc.) during the packet transfer 144b responsive to the "more" message 100b, and the missed transmit opportunity 150b is caused by the failed transfer 154b of a packet during the packet transfer 144c responsive to the "more" message 100c. Further, the missed transmit opportunity 150c is caused by the failed reception 156 of the "more" message 100d.

Hence, if in operation 158 the deterministic network interface circuit 22 does not receive a transport layer packet 16 (or coded packet, management packet, etc.) before its next transmit opportunity on the deterministic link 18 at the corresponding scheduled transmission instance 84 (e.g., 84c) (more specifically, before the beginning of its corresponding transmit queuing latency 78), the deterministic network interface circuit 22 in operation 158 can update its MTO counter value 148 (e.g., increment MTO=7 to MTO=8), and generate and transmit on its deterministic link 18 a discard-eligible OAM frame specifying an error message that a transmit packet was not received before the scheduled transmission instance 84*c*. The OAM frame enables the receiving transport layer 14 to process the OAM frame, perform any error handling (e.g., recovery using a network coded packet, reporting the error to the network manager device 24, etc.) and discard the OAM frame to preserve the queue size of its corresponding transport layer transmit buffer circuit 36.

If, however, in operation 160 the deterministic network interface circuit 22 successfully transmits a link layer data packet 44 (containing, for example, a transport layer packet 16 or a coded packet), for example as illustrated with respect to the scheduled transmission instance 84*a* or the scheduled transmission instance 84*b*, the deterministic network interface circuit 22 in operation 160 increments its SPT counter value 146 (as described with respect to operation 158, if transmission is unsuccessful then the MTO counter value 148 is incremented but the SPT counter value 146 is not incremented).

Hence, in operation 162 the deterministic network interface circuit 22 modifies operation 99 of FIG. 4B by generating each "more" message 100 to include a corresponding "more" message sequence counter (MSC) 164, its switch identifier (e.g., "Switch 1"), its queue identifier (e.g., "Queue 1"), its SPT counter value 146, and its MTO counter value 148. As illustrated in FIG. 7, the "more" message 100*a* output by the deterministic network interface circuit 22 specifies the parameters "Switch 1", "Queue 1", the MSC value 164 of "10", the SPT counter value 146 of "1026", and the MTO counter value 148 of "7". As described previously, each "more" message 100 is output at least the pre-fetch interval 74 before the next scheduled transmission instance 84, hence the "more" message 100*a* is output by the deterministic network interface circuit 22 at least the pre-fetch interval 74 before the scheduled transmission instance 84*b*.

Referring to FIG. 6B, the transport layer 14 detects in operation 166 the "more" message 100 (e.g., 100*a*), and in response can store the received SPT counter value 146 as a stored SPT counter value 146', and store the received MTO counter value 148 as a stored MTO counter value 148'.

The transport layer 14 in operation 166 also can determine if there are any causes in failure of any missed transmit opportunity 150 based on determining the following. The transport layer 14 in operation 166 can determine a first difference (dNPS) 168 between a number of packet transfers 144 sent toward the corresponding deterministic network interface circuit 22 relative to the received "more" message 100 (e.g., 100*a*) and a prior request message (not shown in FIG. 7) contiguously received from the deterministic network interface circuit 22, illustrated in FIG. 7 as the difference (dNPS=1) 168 between the NPS counter value "1970" 142 at the receipt of the "more" message 100*a*, and the NPS counter value "1969" at the receipt of the prior "more" message 100 from the corresponding deterministic network interface circuit 22; similarly, at reception of the "more" message 100*b* the difference 168 is determined as the difference between the NPS counter value "1971" 142 at the receipt of the "more" message 100*b*, and the NPS counter value "1970" at the receipt of the "more" message 100*a*, hence at reception of the "more" message 100*b* the value is "dNPS=1". In other words, the dNPS value "dNPS=1" 168 indicates a successful dequeuing of a data packet from the source host device 10 toward the deterministic network interface circuit 22 via the data link 56.

The transport layer 14 in operation 166 also can determine a second difference (dSPT) 170 in successful packet transmissions by the deterministic network interface circuit 22 relative to the "more" message 100*a* and the prior request message 100, based on comparing the associated SPT counter values 146. Hence, the dSPT value "dSPT=1" 170 indicates a successful packet transmission on the corresponding deterministic link 18 from the prior packet transfer 144 responsive to the prior "more" message 100.

The transport layer 14 in operation 166 also can determine a number of packet losses (NPL) 172 based on comparing the first difference value (dNPS) 168 to the second difference value (dSPT) 170 (i.e., NPL=dNPS−dSPT) to identify any failures in transmission on any scheduled transmission instance 84 since the last received "more" message 100. As illustrated in FIG. 7, the NPL value 172 remains at a zero value until the failed transfer 154*a* of the packet transfer 144*b*, which causes the deterministic network interface circuit 22 in operation 158 to increment its MTO counter value 148 due to the missed transmit opportunity 150*a* at the scheduled transmission instance 84*c*, and to output in the "more" message 100*c* the MTO counter value "MTO=8" 148.

Hence, the transport layer 14 responds to the "more" message 100*c* by determining the dSPT value 170 is equal to zero ("dSPT=0") indicating zero transmissions since the prior "more" message 100*b*, and determining the NPL value 172 is equal to one ("NPL=1"). Hence, the NPL value 172 of "NPL=1" indicates that one failure in transmission occurred on a scheduled transmission instance 84 between the reception of the "more" message 100*c* and the prior reception of the "more" message 100*b*.

The transport layer 14 in operation 166 also can determine a third difference (dMTO) 174 between the first number of any missed transmission opportunities (e.g., MTO=8) 148 specified in the request message (e.g., 100*c*) and a corresponding first number of any missed transmission opportunities (e.g., MTO=7) 148 specified in the previously-received request message (e.g., 100*b*). Since a packet loss due to a failed transfer 154 implies a missed opportunity, there cannot be more packet losses (quantified by the NPL value 172) than missed opportunities (quantified by the dMTO value 174), hence the dMTO value 174 will be greater than or equal to the NPL value 172 (dMTO≥NPL).

Hence, the transport layer 14 in operation 166 can identify a number of lost request messages (dQ) 176, between the request message (e.g., 100*c*) and the prior request message (e.g., 100*b*), based on comparing the third difference (dMTO) 174 to the number of packet losses (NPL) 172 (i.e., dQ=dMTO−NPL). As illustrated in FIG. 7, the dQ value 176 represents the number of missed opportunities that are not due to a packet loss in a failed transfer 154 or not due to a late arrival of a packet transfer 144 after initiation of the transmit queuing latency 78 for the corresponding scheduled transmission instance 84, i.e., the dQ value 176 is the sub-count (subset) of the dMTO value 174 that is due to the failed reception of the "more" message 100.

Hence, the transport layer 14 in operation 166 determines in response to receiving the "more" message 100*c* the nonzero dMTO value 174 value, and that the dQ value 176 is equal to zero. The transport layer 14 in operation 178 can determine from the nonzero dMTO value 174 and the zero dQ value 176 that the cause of failure for the missed transmission opportunity (based on the MTO counter value 148) is due to the failed transfer 154*a* of a transport layer packet 16 (coded packet, etc.) in the packet transfer 144*b* from the source host device 10 to the deterministic network interface circuit 22, where the packet transfer 144*b* was not completed before initiation of the transmit queuing latency 78 for the corresponding scheduled transmission instance 84*c*. As described previously, the failure to complete the packet transfer 144*b* could either be due to a complete packet loss of the data packet on the data link 56, or due to a "late" transfer where the packet transfer 144*b* was not completed until after initiation of the transmit queuing latency 78 for the corresponding scheduled transmission instance 84*c* (a "late" transfer has the same effect as the complete loss of the data packet on the data link 56 because the "late" data packet cannot be transmitted at the scheduled transmission instance 84*c* and is therefore discarded by the deterministic network interface circuit 22).

As illustrated in operation 178 of FIG. 6B, the transport layer 14 need not take any action because the cause of failure for the missed transmission opportunity (as specified in the "more" message 100*c*) was due to the failed transfer 154*a*, hence the packet was "de-queued" (i.e., output) by the device interface circuit 52 from the source host device 10 and the packet was removed from the transport layer transmit buffer circuit 36 accordingly, freeing up the available storage space for the next transport layer packets 16 in the identified flow of application data.

As described previously, the ASIC 130 of the device interface circuit 52 in operation 180 can prefetch a number of transport layer packets 16 (e.g., two or more) from the transport layer transmit buffer circuit 36 and store the fetched transport layer packets 16 in the transmit buffer circuit 132. Hence, the device interface circuit 52 can provide ASIC-class responsiveness in providing a minimal retrieval latency 76 for responding to a received "more" message 100 by outputting (during the next packet transfer 144) the "next" packet queued for transmission in the transmit buffer circuit 132. Hence, in response to the device interface circuit 52 receiving the "more" message 100*c*, the ASIC 130 can notify the transport layer 14 of the received "more" message 100 (causing the transport layer 14 to execute operations 166 and 178), and determine before transmission if a discard signal (e.g., a 2-bit or more control signal) corresponding to the dQ value 176 is asserted by the transport layer 14.

Since the dQ value 176 value is zero in response to the "more" message 100*c* as described previously, the discard signal is not asserted and the ASIC 130 of the device interface circuit 52 in operation 182 can initiate the packet transfer 144 (within the retrieval latency 76 and before initiation of the transmit queuing latency 78 for the scheduled transmission instance 84*d*) of the next packet queued for transmission in the transmit buffer circuit 132. As illustrated in FIG. 7, the next packet that is dequeued during the packet transfer 144*c* includes the corresponding MSC value 164 (MSC=12), enabling the deterministic network interface circuit 22 to associate a received packet with the previously-transmitted "more" message 100*c*.

As illustrated in FIG. 7, the failed transfer 154*b* by the transmit queuing latency 78 preceding the scheduled transmission instance 84*d* causes the missed transmit opportunity 150*b* at the scheduled transmission instance 84*d*; hence, the deterministic network interface circuit 22 responds to the missed transmit opportunity 150*b* by incrementing its MTO counter value 148 to "MTO=9" in operation 152, and incrementing the sequence counter for the MSC value 164, resulting in the deterministic network interface circuit 22 outputting in operation 162 the "more" message 100*d* specifying the MSC value 164 of "MSC=13", the SPT counter value 146 of "SPT=1027", and the MTO counter value 148 of "MTO=9". (The deterministic network interface circuit 22 also can execute operation 158 for transmission at the scheduled transmission instance 84*d* of an OAM frame on the deterministic link 18). However, the failed reception 156 of the "more" message 100*d* results in no packet transmission by the source host device 10, resulting in an increase in latency in the transport layer transmit buffer circuit 36 due to the failure to dequeue the next transport layer packet 16 from the transport layer transmit buffer circuit 36 (or the transmit buffer circuit 132) for the next scheduled transmission instance 84*e*.

Consequently, the failed reception 156 of the "more" message 100*d* also results in the missed transmit opportunity 150*c* at the scheduled transmission instance 84*e*, causing the deterministic network interface circuit 22 to increment is MTO counter value 148 in operation 152, and output the "more" message 100*e* specifying the MSC value 164 of "MSC=14", the SPT counter value 146 of "SPT=1027", and the MTO counter value 148 of "MTO=10". The transport layer 14, in response to detecting the "more" message 100*e*, can calculate in operation 166 the dNPS value 168, the dSPT value 170, the NPL value 172, the dMTO value 174, and dQ value 176.

As illustrated in FIG. 7, the transport layer 14 at event 178 determines from the received "more" message 100*e* that the dQ value 176 has a nonzero value ("dQ=1"), and in response the transport layer 14 in operation 178 can assert a discard signal asserting that "dQ=1" discard-eligible packets need to be discarded.

The ASIC 130 in the device interface circuit 52 in operation 178 can increment an internal counter (C(DE)) according to the dQ value 176. Since the ASIC 130 can execute more efficiently than the transport layer operations executed by the processor circuit 12, the ASIC 130 in the device interface circuit 52 can discard in operation 182 the next "dQ=1" discard-eligible packets stored in the transmit buffer circuit 132, enabling the device interface circuit 52 in operation 182 to initiate packet transfer 144*d* for the next packet stored in the transmit buffer circuit 132 (following the "dQ=1" discarded packet). Hence, the discard signal enables the device interface circuit 52 to transfer during the packet transfer 144*d* a second transport layer packet, having been retrieved from the transport layer transmit buffer circuit 36 following the one discard-eligible transport layer packet, in response to the "more" message 100*e* and prior to the transmit queuing latency 78 of the next transmission instance 84.

As described previously, the device interface circuit 52 outputs the next packet stored in the transmit buffer circuit 132 with the sequence identifier value "MSC=14" 164 specified in the "more" message 100*e*, enabling the deterministic network interface circuit 22 identify the packet transfer 144*d* as responsive to the "more" message 100*e*.

According to the example embodiments, the transport layer 14 can execute corrective actions, as needed for mitigation of transmission failures and to prevent an increase in latency of the transport layer packets 16 stored in the transport layer transmit buffer circuit 36. Hence, the example embodiments enable a fault-tolerant deterministic transport system that ensures that a failed transmission opportunity does not disrupt the deterministic transport of the transport layer packets 16 across the deterministic links 18.

Another example of corrective action can include the transport layer 14 in operation 184 selectively reducing the coding ratio (N:1), for the coded packets, in response to determining a failure in one of the deterministic network interface circuits 22. For example, the transport layer 14 can initially set the coding ratio to "N=4" in response to receiving from the network manager device 24 a notification that four separate and distinct deterministic network interface circuits 22 are allocated within four separate and distinct switching devices 38 for the deterministic transport of the transport layer packets 16 across the four deterministic network interface circuits 22 in the respective switching devices 38. The transport layer 14 can track the continued availability of the switching devices 38 via the "more" message 100s and/or keep-alive messages transmitted by the switching devices 38.

In response to determining a failure in one of the deterministic network interface circuits 22 (and or the associated switching device 38), for example due to a failure in detecting any keep-alive messages or "more" message 100s for a prescribed interval, the transport layer 14 in operation 184 can reduce the coding rate by reducing the corresponding number (N=N−1) of allocated deterministic network interface circuits 22, changing in this above example from "N=4" to "N=3" to provide a 3:1 rate instead of the prior 4:1 coding rate. Hence, the lower 3:1 coding rate can provide a lower throughput requirement across the remaining available three deterministic network interface circuits 22, ensuring the deterministic transport across the remaining three (3) deterministic links 18 can be maintained.

According to example embodiments, a transport layer can mitigate against missed transmission opportunities to avoid an increase in latency in the transport packets that need to be deterministically transmitted across multiple deterministic links. The discarding of discard-eligible packets can be resolved by a receiving transport layer recovering a lost data packet using error recovery techniques such as network coding, where a lost packet can be recovered from an N:1 coded packet and other protected packets used to generate the N:1 coded packet.

Figure 8:
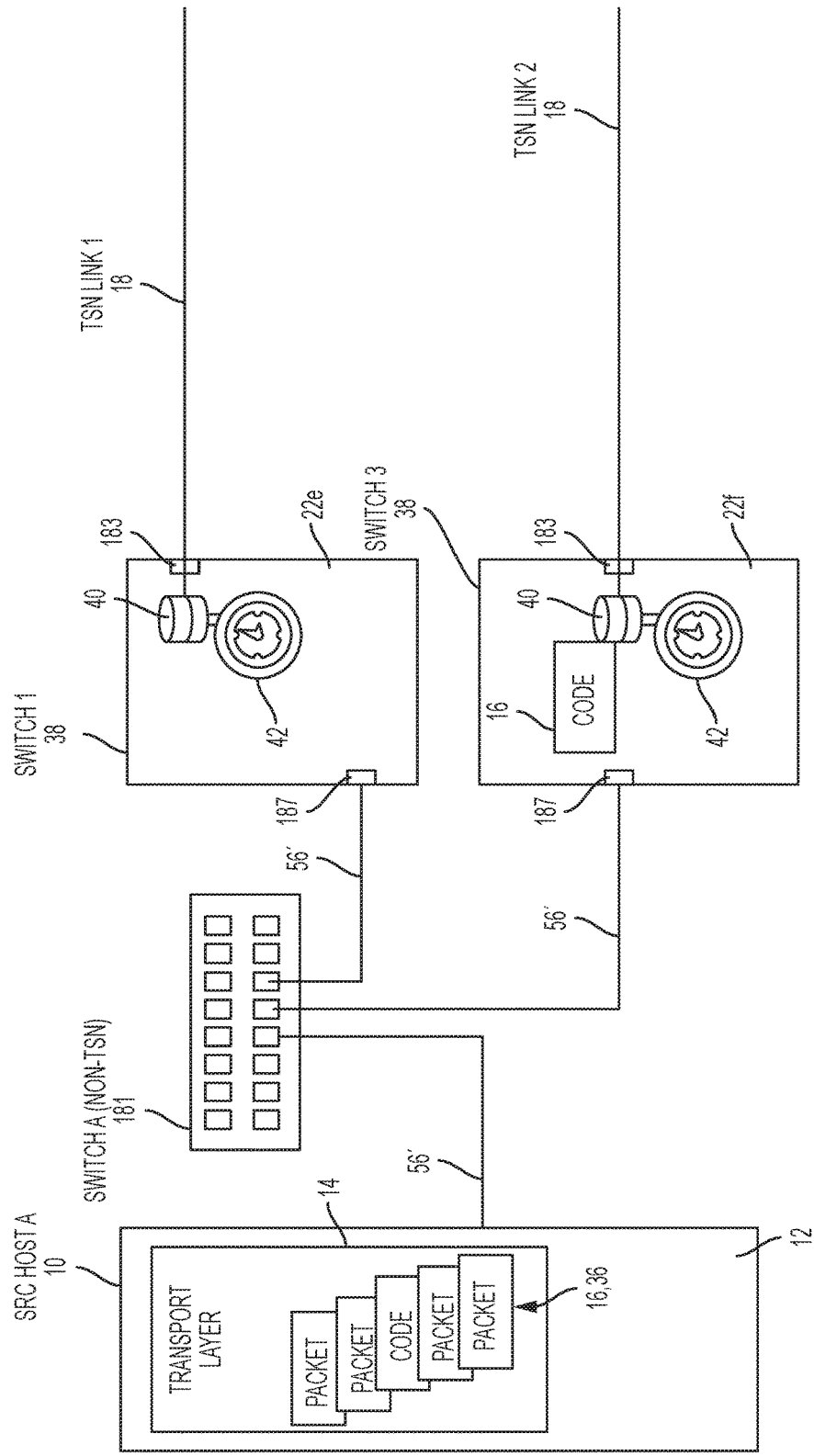
FIG. 8 illustrates another example of deterministic interface circuits providing deterministic transport of transport layer packets across multiple deterministic links, based on correcting latency in retrieving transport layer packets from a host device via a non-deterministic switch, according to an example embodiment.

Latency Correction Between Transport Layer Host and Deterministic Interface Circuit FIG. 8 illustrates another example of the deterministic interface circuits (e.g., 22e and 22f within the respective switches "Switch 1" 38 and "Switch 3") providing deterministic transport of transport layer packets (and/or coded packets, etc.) 16 across multiple deterministic links 18, based on correcting latency in retrieving transport layer packets 16 from a host device 10 or 10" via a non-deterministic switch 181, according to an example embodiment. As described previously (e.g., with respect to FIGS. 1H-J, 2, 6A-6B, 7), each deterministic network interface circuit 22 could be coupled to the source host device 10 via a TOR switch device 28 providing a high-speed, low-latency data link 56 that enables the deterministic network interface circuit 22 to send a "more" message 100 and receive a corresponding packet transfer 144 before the next scheduled transmission instance 84.

Use of a non-deterministic switch 181, for example a lower-cost unmanaged switch providing non-deterministic data links 56' with variable end-to-end jitter, latency, and limited throughput between the source host device 10 and each deterministic network interface circuit 22 can result in an inability for a deterministic network interface circuit 22 to transmit a "more" message 100 and receive the corresponding packet transfer 144 before the next scheduled transmission instance 84. Further, each switching device 38 (or its corresponding deterministic network interface circuit 22) can be connected to a different switch port of the non-deterministic network switch 181, which may cause each deterministic network interface circuit 22 to encounter different latency, jitter, etc., depending on the configuration and/or status of the non-deterministic network switch 181.

According to example embodiments, each deterministic network interface circuit 22 can determine a round-trip latency (L) (188 of FIG. 10) between sending a request for data to the source host device 10 (e.g., a "more" message 100) via a non-deterministic data link 56' (and via the non-deterministic network switch 181), and receiving a transport layer packet 16 within a packet transfer 144 responsive to the request. Each deterministic network interface circuit 22 can respond to the determined round-trip latency (L) 188 by sending to the source host device 10 an instruction for initiating the packet transfer 144, where the instruction corrects for the round-trip latency 188 and enables the deterministic network interface circuit 22 to receive the transport layer packet 16 for transmission at the corresponding scheduled transmission instance 84 on the corresponding deterministic link 18.

Figure 9A:
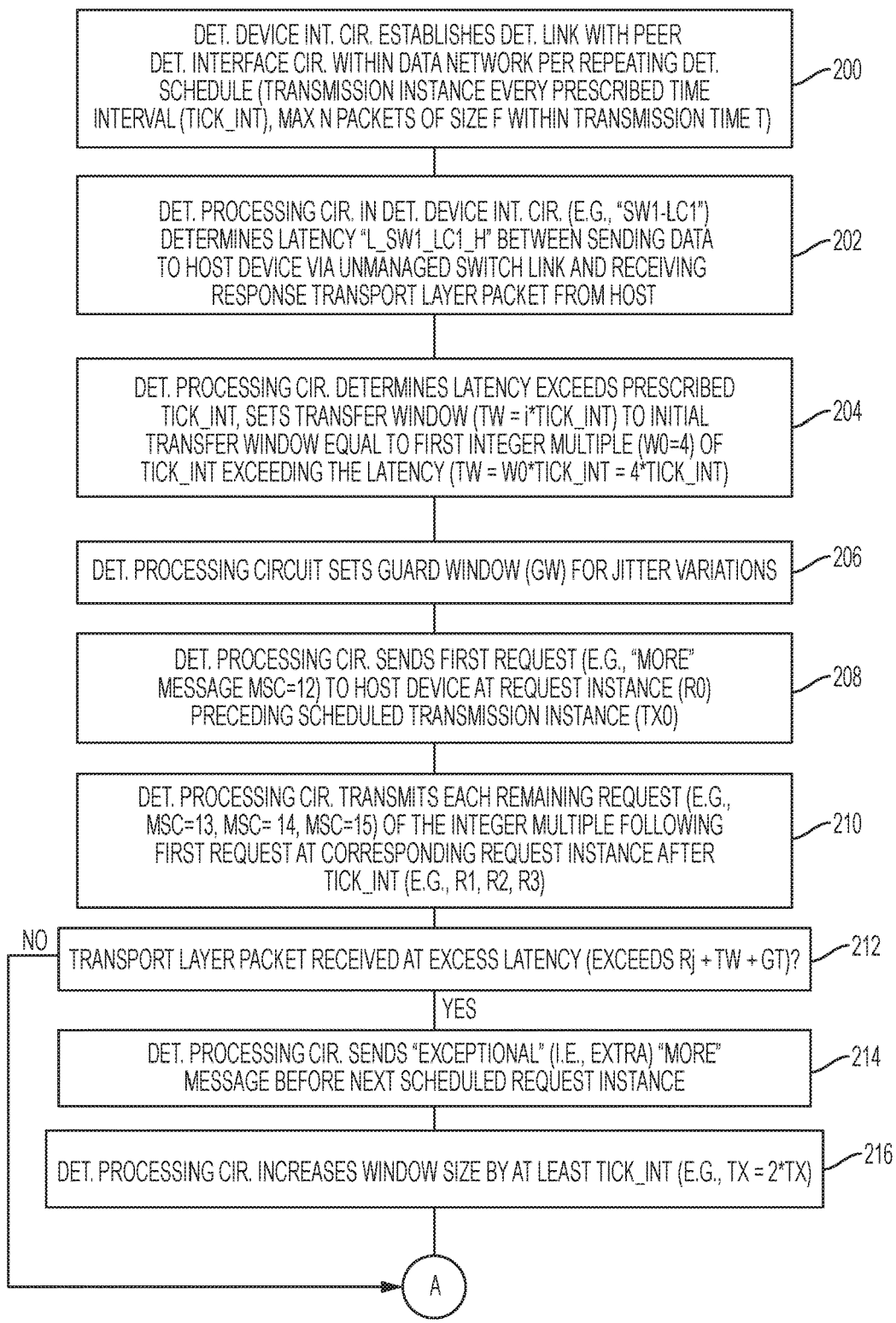
FIGS. 9A and 9B illustrate a deterministic interface circuit correcting latency in retrieving transport layer packets from a host device for deterministic transport on a deterministic link, according to an example embodiment.
Figure 9B:
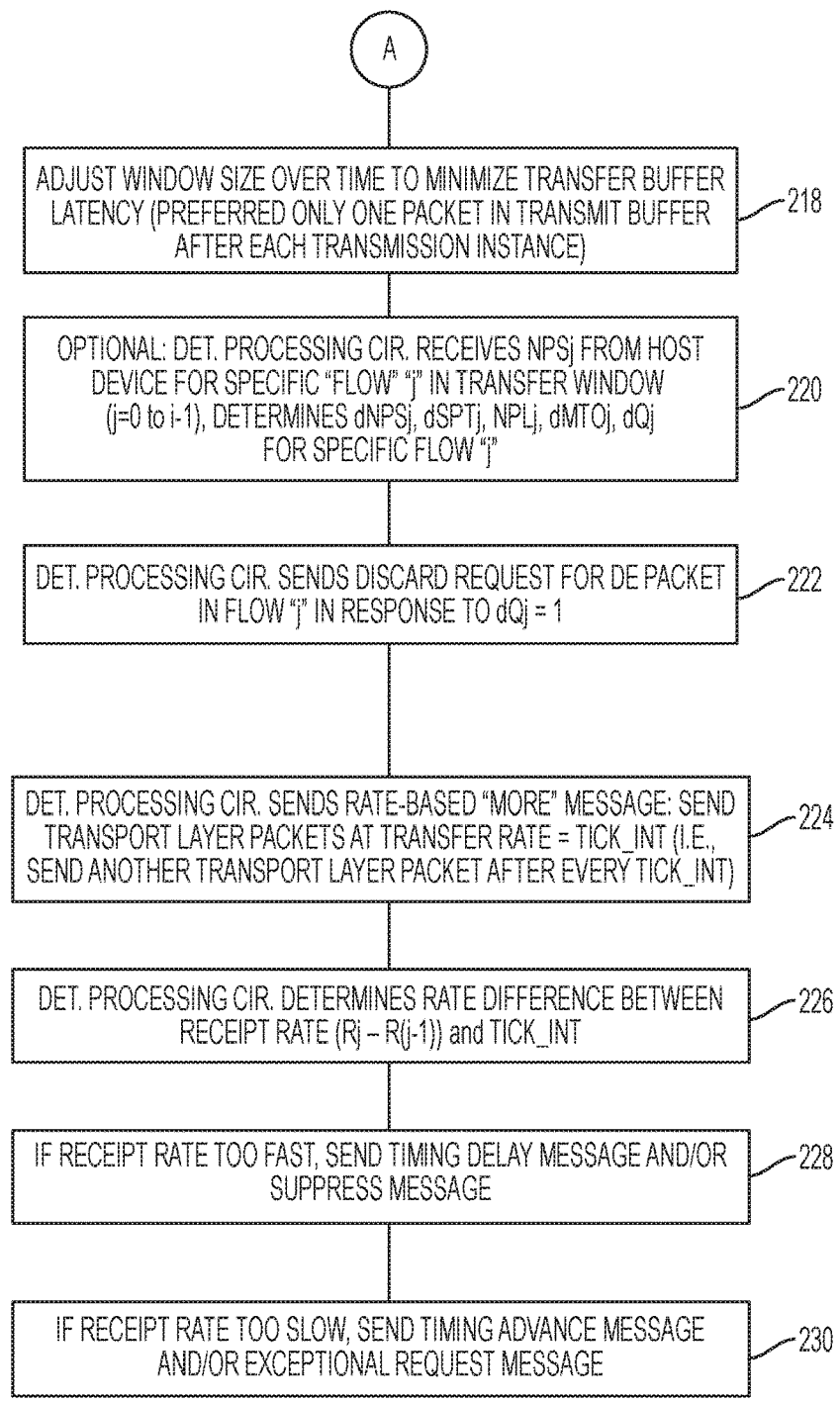

FIGS. 9A and 9B illustrate a deterministic interface circuit correcting latency in retrieving transport layer packets from a host device for deterministic transport on a deterministic link, according to an example embodiment. Each deterministic network interface circuit 22 (e.g., 22e and 22f of FIG. 8) comprises a ASIC 42, also described herein as a deterministic processing circuit implemented as an ASIC; in other words, an ASIC implemented in the deterministic network interface circuit 22 can execute as a deterministic processing circuit that executes the operations described herein, including the above-described operations of the ASIC 42. Hence, the transmit/receive gate circuit 42 also is referred to herein as an "ASIC" 42. In an alternate embodiment, the deterministic processing circuit can be executed by a first ASIC in the deterministic network interface circuit 22 and the transmit/receive gate circuit can be executed by a different and distinct ASIC in the deterministic network interface circuit 22. The transmit/receive buffer circuit 40 can be implemented within a separate and distinct memory circuit (54 of FIG. 3), and/or the transmit/receive buffer circuit 40 can be implemented in any one of the ASICs described herein.

The deterministic network interface circuit 22 (e.g., 22e) can include a deterministic link transceiver 183, under the control of the ASIC 42: the ASIC 42 is configured for establishing in operation 200 a deterministic link 18 with its peer deterministic network interface circuit 22 (e.g., 22i of FIGS. 1H-1J and FIG. 2) within the deterministic data network 20, as described previously. As described previously, the ASIC 42 establishes the deterministic link 18 (via the deterministic link transceiver 183) per a repeating deterministic schedule 185, where a transmission instance 84 coincides with the reception instance of the peer deterministic network interface circuit 22, and where each scheduled transmission instance 84 is repeated after every time interval (e.g., a "tick" interval "TICK_INT") 186 established by the network manager device 24; in other words, the deterministic schedule 185 is maintained by the prescribed "tick" interval 186 between each scheduled transmission instance 84, where the deterministic network interface circuit 22 can transmit a maximum number of "N" packets of size "F" within a transmission time "T" that is within the "tick" interval 186. The deterministic network interface circuit 22 also includes a non-deterministic link transceiver 187 configured for sending "more" messages 100, and receiving packet transfers 144, via the non-deterministic data link 56'.

Figure 10:
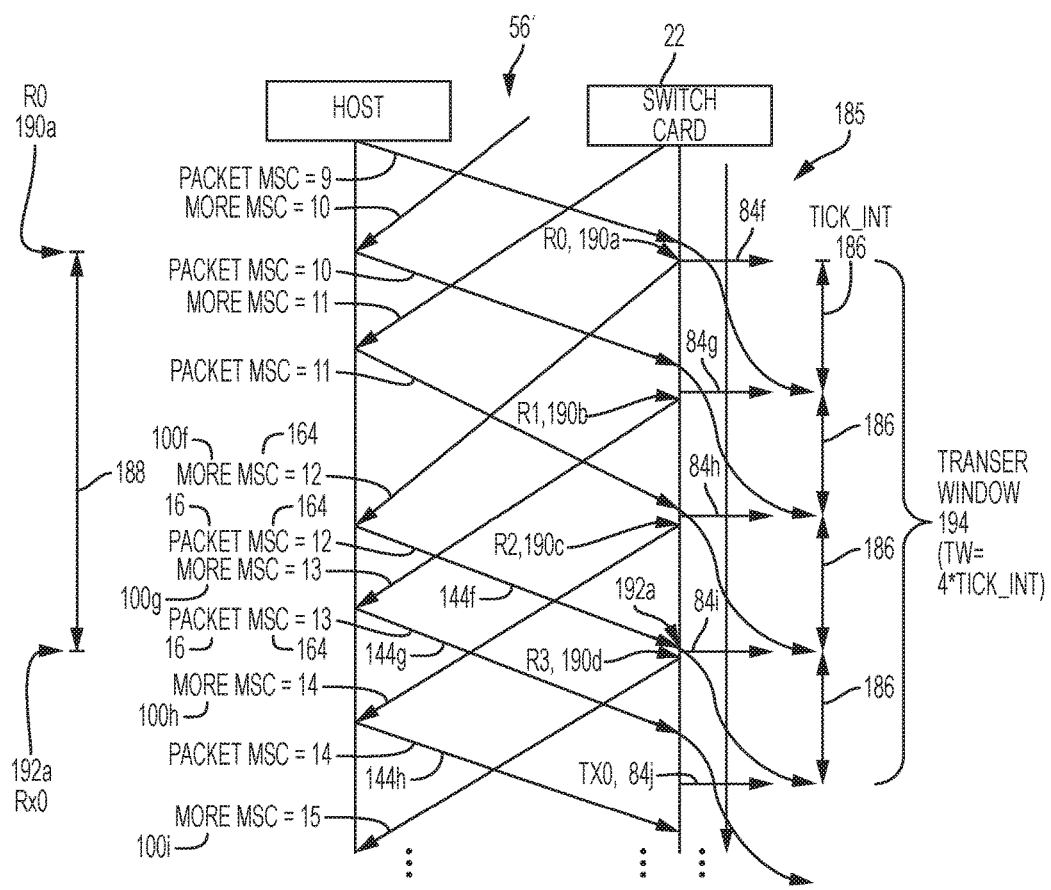
FIG. 10 illustrates an example transfer window that corrects for latency by requesting a transport layer packet at a request instance preceding a corresponding transmission instance by at least a transfer window, while minimizing latency in the deterministic network interface circuit, according to an example embodiment.

FIG. 10 illustrates an example transfer window 194 that corrects for a round-trip latency 188 by requesting a transport layer packet at a request instance (e.g., 190a) preceding a corresponding transmission instance (e.g., 84j) by at least the transfer window 194, while minimizing latency in the deterministic network interface circuit 22e, according to an example embodiment.

The ASIC 42 in operation 202 in the deterministic network interface circuit 22e (e.g., "Switch 1, Line Card 1" (SW1-LC1) can determine in operation 202 a round-trip latency ("L_SW1_LC1_H") 188 between the deterministic network interface circuit 22e sending a "more" message 100f to the source host device 10 via the non-deterministic network switch 181 at a request instance "R0" 190a, and the deterministic network interface circuit 22e receiving the transport layer packet 16 via a corresponding packet transfer 144 (identified by the corresponding MSC value 164 (e.g., MSC=12") at a corresponding reception instance "Rx0" 192a. In other words, the round-trip latency "L_SW1_LC1_H" 188 is equal to the reception instance "Rx0" 192a minus the request instance "R0". The round-trip latency 188 can be recalculated, aggregated, etc., as statistically desirable by the ASIC 42 as additional packet transfers 144 are received.

The ASIC 42 of the deterministic network interface circuit 22e can determine in operation 204 that the round-trip latency 188 exceeds the prescribed "tick" interval 186, and in response the ASIC 42 can set a transfer window (TW) 194 to a first integer multiple (i=4) of the prescribed "tick" interval 186 (i.e., TW=i*TICK_INT), resulting in an initial transfer window (W0) having duration equal to a first integer multiple (i=4) of the "tick" intervals 186 (e.g., 22 milliseconds) and that exceeds the round-trip latency 188 (i.e., TW=W0=i*TICK_INT=4*TICK_INT). As illustrated in FIG. 10, the transport layer 14 having the initial integer multiple of "4" "tick" intervals 186 (e.g., TW=88 milliseconds) exceeds the round-trip latency 188 (e.g., 64 milliseconds) and enables the deterministic network interface circuit 22e to receive the packet transfer 144 at least one "tick" interval 186 before the corresponding scheduled transmission instance 84i allocated for the transport layer packet 16 requested by the "more" message 100f.

The ASIC 42 of the deterministic network interface circuit 22e in operation 206 also can set a guard window (GW) to account for any jitter variations that may be encountered in the non-deterministic data link 56' via the non-deterministic network switch 181, for example due to imprecise timing between the source host device 10, the non-deterministic network switch 181, and the deterministic network interface circuit 22e. An example value for the guard window can be one fourth of the "tick" interval 186 (e.g., 10.5 milliseconds).

Hence, the ASIC 42 of the deterministic network interface circuit 22e in operation 208 sends the "more" message 100f (specifying the MSC value "12" 164) at the request instance "R0" 190a that precedes the scheduled transmission instance "TX0" 84j by at least the transfer window (TW) 194. The ASIC 42 of the deterministic network interface circuit 22e in operation 210 also transmits each remaining request 100g (specifying the MSC value "13" 164), 100h (specifying the MSC value "14" 164), and 100i (specifying the MSC value "15" 164) of the integer multiple (i=4), at the corresponding request instance "R1" 190b, "R2" 190c, and "R3" 190d following the next successive "tick" interval 186, and before expiration of the transfer window (TW) 194. Hence, the ASIC 42 of the deterministic network interface circuit 22e can transmit multiple successive "more" messages 100g, 100h, and 100i while awaiting the initial "more" message 100f. As described previously, each packet transfer 144 can specify the corresponding MSC value 164, enabling the ASIC 42 of the deterministic network interface circuit 22 to determine in operation 212 that the received packet transfer 144f (specifying "MSC=12") for the transport layer packet 16 is responsive to the "more" message 100f (specifying "MSC=12").

The ASIC 42 of the deterministic network interface circuit 22e in operation 212 can determine the reception instance (e.g., Rx0) 192a for the packet transfer 144f responsive to the "more" message 100f, and determine whether the reception instance (e.g., Rx0) 192a for the packet transfer 144f was received at an excess latency, where the value for the reception instance (e.g., Rx0) 192a is greater than the request instance "R0" 190a plus the transfer window (TW) 194 plus the guard window.

If in operation 212 the ASIC 42 of the deterministic network interface circuit 22 in the switching device 38 determines the reception instance (e.g., Rx0) 192a for the transport layer packet 16 exceeded the deterministic schedule 185 and guard window (i.e., Rx0>R0+TW+GW), the ASIC 42 of the deterministic network interface circuit 22e in operation 214 can send an "exceptional" "more" message 100 before transmission of the next scheduled "more" message 100 at the next scheduled request instance 190. In effect, the "exceptional" "more" message 100 serves to "jump start" the source host device 10 into sending an extra transport layer packet 16 to avoid buffer underflow in the transmit/receive buffer circuit 40 which would cause a missed transmit opportunity. The ASIC 42 of the deterministic network interface circuit 22e in operation 216 also can increase the size of the transfer window (TW) 194 by at least one additional integer multiple (i=i+1) of the "tick" interval 186; the ASIC 42 also can substantially increase the size of the transfer window (TW) 194 by doubling the window size (TW=2*TW) in order to aggressively capture more transport layer packets 16 to avoid a missed transmit opportunity.

As illustrated in FIG. 9B, the deterministic network interface circuit 22e can adjust the size of the transfer window (TW) 194 over time to minimize the transmit buffer latency in the transmit/receive buffer circuit 40. According to one embodiment, a preferred transmit buffer can be reduced to the transmit/receive buffer circuit 40 storing only a single link layer data packet 44 after each scheduled transmission instance 84, where optimally the transmit/receive buffer circuit 40 need store a minimum of one (and a maximum of two) packets awaiting transmission at the next scheduled transmission instance 84.

Hence, the generation and adjustment of the transfer window (TW) 194 in response to determining the round-trip latency 188, and based on successive comparisons of whether the corresponding reception instance 192 is within the transfer window (TW) 194 (and guard window (GW)), enables the ASIC 42 of the deterministic network interface circuit 22 to correct for latency caused by the non-deterministic network switch 181, while minimizing queuing latency in the transmit/receive buffer circuit 40. As described previously with respect to FIGS. 6A, 6B, and 7, the transport layer 14 was described as determining whether a "more" message 100 was lost based on determining the dQ value 176. According to an example embodiment, the ASIC 42 in the deterministic network interface circuit 22e can execute similar operations based on identifying each "more" message 100 associated with a modulo counter value "i", such that the source host device 10 and the deterministic network interface circuit 22e can track the counter values, illustrated in FIG. 7, on a per-flow basis; in other words, the counters 142, 146, 148, 168, 170, 172, 174, and 176 are reproduced for each "more" message 100f sent at the request instance 190a for flow "R0", the "more" message 100g sent at the request instance 190b for flow "R1", the "more" message 100h sent at the request instance 190c for flow "R2", and the "more" message 100i sent at the request instance 190d for the flow "R4". The counter values 142, 146, 148, 168, 170, 172, 174, and 176 can be updated for each repeating instance of the transfer window (TW) 194. Hence, the ASIC 42 can maintain the transport layer 146 and the transport layer 148 for each flow "j" (e.g., for "R0", "R1", "R2", "R3") (where "j=0 to (i−1)").

Further, the deterministic network interface circuit 220 in operation 220 can be configured for executing the operations described above with respect to FIGS. 6A, 6B, and 7, based on receiving from the source host device 10, for each "j" flow (e.g., "R0", "R1", "R2", "R3") (where "j=0 to (i−1)") the corresponding NPS counter value 142 (e.g., NPS_R0, NPS_R1, NPS_R2, and/or NPS_R3, referred to generally as "NPS_Rj"). In response to receiving the NPS counter value 142 for a given flow "j", the ASIC 42 of the deterministic network interface circuit 22e in operation 220 can determine the associated counter values, for each flow "j", including the dNPS value 168, dSPT value 170, NPL value 172, dMTO value 174, and dQ value 176.

Hence, in response to detecting a dQ value 176 having a value of "1" for a given flow "j" (i.e., dQj=1"), the ASIC 42 of the deterministic network interface circuit 22e in operation 222 can send a discard request to the source host device 10, causing the device interface circuit 52 to discard its next available packet for the corresponding flow "j" from its transmit buffer circuit 132, as described previously.

In another embodiment, the ASIC 42 of each deterministic network interface circuit 22 can send to the source host device 10 in operation 224 an instruction in the form of a "rate-based more message" 100 that explicitly describes a transfer rate for the host device 10 to transfer the transport layer packets 16 at a transfer rate based on the deterministic schedule 185 that establishes transmission rate as the prescribed "tick" interval 186 between each transmission instance 84. Hence, the ASIC 42 can specify a single "rate-based more message" 100 that explicitly identifies the "tick" interval 186 (i.e., "Transfer Rate=TICK_INT"; "Send Another Packet After Every TICK_INT"). The device interface circuit 52 in the source host device 10 can respond to the "rate-based more message" 100 by immediately initiating its next packet transfer 144, and executing the next packet transfer 144 after every "tick" interval 186 as counted by the device interface circuit 52.

As described previously, each deterministic network interface circuit 22 communicates with the device interface circuit 52 of the source host device 10 via a non-deterministic data link 56' provided by the non-deterministic network switch 181; hence, the clock signals maintained by the device interface circuit 52 in the source host device 10 will not be fully synchronized in frequency and phase with the precise clock signals maintained by the deterministic network interface circuit 22 in accordance with the deterministic data network 20 (e.g., according to TSN).

According to an example embodiment, the ASIC 42 can determine latency between the deterministic network interface circuit 22e and the source host device 10 (via the non-deterministic network switch 181 and associated non-deterministic data links 56) based on identifying in operation 226 a rate difference between a rate of receiving the transport layer packets from the host device 10 (e.g., R_Rx=Rj-R(j−1)) and the transmission rate of the deterministic schedule 185 at every "tick" interval 186.

In response to detecting the rate of receiving (R_Rx) is faster than the "tick" interval 186 (i.e., R_Rx<TICK_INT), the ASIC 42 of the deterministic network interface circuit 22e in operation 228 can send in operation 228 a timing delay message for compensation of the rate difference by a specified delay interval, where the timing delay message can cause the host device 10 to delay its clock timing for the next scheduled transport layer packet that is scheduled according to the transfer rate, effectively "pushing back" its clock value by the specified delay interval. The ASIC 42 of the deterministic network interface circuit 22e in operation 228 also can output a "less" message that operates as a suppress message for compensation of the rate difference, causing the device interface circuit 52 in the source host device 10 to suppress transmission of the next scheduled transport layer packet that is scheduled according to the transfer rate.

In response to the ASIC 42 of the deterministic network interface circuit 22e detecting the rate of receiving (R_Rx) is slower than the "tick" interval 186 (i.e., R_Rx>TICK_INT), the ASIC 42 of the deterministic network interface circuit 22e in operation 230 can send in operation 230 timing advance message that causes the device interface circuit 52 in the source host device 10 to advance its clock timing, by a specified advance interval, for the next scheduled transport layer packet that is scheduled according to the transfer rate, effectively "pushing forward" its clock value by the specified advance interval. The ASIC 42 of the deterministic network interface circuit 22e in operation 230 also can output an exceptional "more" message 100, as described previously, for the next transport layer packet before the next scheduled transport layer packet according to the transfer rate. Hence, the device interface circuit 52 can respond to the exceptional "more" message 100 by immediately starting the next packet transfer 144, before expiration of the "tick" interval 186, as an extra transmission that precedes the scheduled transfer at the next packet transfer 144.

According to example embodiments, deterministic transport can be established across multiple deterministic data links, even if lower-performance switching devices are deployed between a host device and a deterministic device interface circuit, based on correcting for detected latencies between the transport layer host and the deterministic interface circuit. It should be noted that each transmission instance and associated time interval therebetween (e.g., the "tick" interval) need not necessarily be implemented as periodic (i.e., repeating according to a fixed period), rather the example embodiments can be implemented using non-periodic transmission instances where each "more" message is transmitted to the host device circuit early enough to correct for the latency.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
   establishing, by a deterministic device interface circuit, a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit;

determining, by the deterministic device interface circuit, a latency between sending a request for data to a host device via a non-deterministic data link provided by a network switch, and receiving from the host device a transport layer packet responsive to the request; and sending, by the deterministic device interface circuit, an instruction to the host device for initiating transfer of the transport layer packet, the instruction correcting for the latency and enabling the deterministic device interface circuit to receive the transport layer packet for transmission of a corresponding data packet on the deterministic link at the corresponding transmission instance.

2. The method of claim 1, wherein:

the determining includes determining the latency exceeds a prescribed time interval between each transmission instance in the deterministic schedule; and the sending of the instruction includes setting a transfer window to an initial transfer window equal to a first integer multiple of the prescribed time interval and exceeding the latency, first transmitting at a request instance, from the deterministic device interface circuit to the host device, a first request for a first transport layer packet, the request instance preceding the corresponding transmission instance for the first transport layer packet by the transfer window, and transmitting each remaining of the integer multiple of the requests following the first request at the corresponding request instance after each prescribed time interval.

3. The method of claim 2, wherein:

the determining of the latency further includes setting a guard window that encompasses a jitter variation on the non-deterministic data link;

determining whether one of the transport layer packets is received at an excess latency that exceeds the corresponding request instance by more than the initial transfer window and the guard window; and increasing the transfer window by at least the prescribed interval in response to detecting the one transport layer received after the excess latency.

4. The method of claim 3, further comprising the deterministic network interface circuit sending to the host device an exceptional request message, for a next transport layer packet, before the next request message scheduled for transmission after the prescribed time interval.

5. The method of claim 2, wherein the sending of the instruction includes at least one of adjusting the transfer window or transmitting an exceptional request message to the host device, based on reception of the transport layer packets responsive to the request, for maintaining storage of a single transport layer packet in a transmit buffer of the deterministic network interface circuit after each transmission instance of a corresponding transmitted data packet from the transmit buffer.

6. The method of claim 2, wherein the determining includes:

receiving, from the host device for each integer multiple of the requests, a number of packets sent for the corresponding integer multiple of requests; and determining, by the deterministic network interface circuit for each integer multiple of the requests, whether a corresponding one of the requests was not received by the host device based on the corresponding number of packets sent relative to a corresponding count of successful packet transmissions and a corresponding count of missed transmit opportunities on the deterministic link;

the instruction specifying that the host device discards a discards a discard-eligible transport layer packet and transfers a subsequent transport layer packet, at the corresponding request instance, in place of the discard-eligible transport layer packet.

7. The method of claim 1, further comprising the deterministic device interface circuit sending a second instruction to the host device for transferring transport layer packets at a transfer rate based on the deterministic schedule establishing a transmission rate as a prescribed time interval between each transmission instance;

the determining of the latency includes the deterministic device interface circuit identifying a rate difference between a rate of receiving the transport layer packets from the host device and the transmission rate of the deterministic schedule;

the sending including the deterministic device interface circuit specifying in the instruction one of an exceptional request message or a suppress message for compensation of the rate difference, the exceptional request message for a next transport layer packet before a next scheduled transport layer packet according to the transfer rate, the suppress message for suppressing transmission of the next scheduled transport layer packet that is scheduled according to the transfer rate.

8. The method of claim 7, wherein the sending further includes the deterministic device interface circuit sending at least one of a timing advance message or a timing delay message for further compensation of the rate difference, the timing advance message causing the host device to advance its timing for the next scheduled transport layer packet that is scheduled according to the transfer rate, the timing delay message causing the host device to delay its timing for the next scheduled transport layer packet that is scheduled according to the transfer rate.

9. An apparatus comprising:

a memory circuit configured for storing a data packet within a transmit buffer; and a deterministic processing circuit configured for establishing a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit;

the deterministic processing circuit configured for determining a latency between sending a request for data to a host device via a non-deterministic data link provided by a network switch, and receiving from the host device a transport layer packet responsive to the request;

the deterministic processing circuit configured for sending an instruction to the host device for initiating transfer of the transport layer packet, the instruction correcting for the latency and enabling the apparatus to receive the transport layer packet for transmission of a corresponding data packet on the deterministic link at the corresponding transmission instance.

10. The apparatus of claim 9, wherein:

the deterministic processing circuit is configured for determining the latency exceeds a prescribed time interval between each transmission instance in the deterministic schedule; and the deterministic processing circuit is configured for setting a transfer window to an initial transfer window equal to a first integer multiple of the prescribed time interval and exceeding the latency;

the deterministic processing circuit further configured for first transmitting at a request instance to the host device a first request for a first transport layer packet, the request instance preceding the corresponding transmission instance for the first transport layer packet by the transfer window, the deterministic processing circuit further configured for transmitting each remaining of the integer multiple of the requests following the first request at the corresponding request instance after each prescribed time interval.

11. The apparatus of claim 10, wherein the deterministic processing circuit is configured for:

setting a guard window that encompasses a jitter variation on the non-deterministic data link;

determining whether one of the transport layer packets is received at an excess latency that exceeds the corresponding request instance by more than the initial transfer window and the guard window; and increasing the transfer window by at least the prescribed interval in response to detecting the one transport layer received after the excess latency.

12. The apparatus of claim 11, wherein the deterministic processing circuit is configured for sending to the host device an exceptional request message, for a next transport layer packet, before the next request message scheduled for transmission after the prescribed time interval.

13. The apparatus of claim 10, wherein the deterministic processing circuit is configured for at least one of adjusting the transfer window or transmitting an exceptional request message to the host device, based on reception of the transport layer packets responsive to the request, for maintaining storage of a single transport layer packet in the transmit buffer after each transmission instance of a corresponding transmitted data packet from the transmit buffer.

14. The apparatus of claim 10, wherein the deterministic processing circuit is configured for:

receiving, from the host device for each integer multiple of the requests, a number of packets sent for the corresponding integer multiple of requests;

determining, for each integer multiple of the requests, whether a corresponding one of the requests was not received by the host device based on the corresponding number of packets sent relative to a corresponding count of successful packet transmissions and a corresponding count of missed transmit opportunities on the deterministic link; and specifying in the instruction that the host device discards a discard-eligible transport layer packet and transfers a subsequent transport layer packet, at the corresponding request instance, in place of the discard-eligible transport layer packet.

15. The apparatus of claim 9, wherein the deterministic processing circuit is configured for:

sending a second instruction to the host device for transferring transport layer packets at a transfer rate based on the deterministic schedule establishing a transmission rate as a prescribed time interval between each transmission instance;

identifying a rate difference between a rate of receiving the transport layer packets from the host device and the transmission rate of the deterministic schedule;

specifying in the instruction one of an exceptional request message or a suppress message for compensation of the rate difference, the exceptional request message for a next transport layer packet before a next scheduled transport layer packet according to the transfer rate, the suppress message for suppressing transmission of the next scheduled transport layer packet that is scheduled according to the transfer rate.

16. The apparatus of claim 15, wherein the deterministic processing circuit is configured for sending at least one of a timing advance message or a timing delay message for further compensation of the rate difference, the timing advance message causing the host device to advance its timing for the next scheduled transport layer packet that is scheduled according to the transfer rate, the timing delay message causing the host device to delay its timing for the next scheduled transport layer packet that is scheduled according to the transfer rate.

17. One or more non-transitory tangible media encoded with logic for execution by a machine and when executed by the machine operable for:

establishing, by the machine implemented as a deterministic device interface circuit, a deterministic link with a peer deterministic interface circuit within a deterministic data network based on identifying a repeating deterministic schedule for transmitting each data packet, allocated to the deterministic schedule, at a corresponding transmission instance coinciding with a reception instance by the peer deterministic interface circuit;

determining a latency between sending a request for data to a host device via a non-deterministic data link provided by a network switch, and receiving from the host device a transport layer packet responsive to the request; and sending an instruction to the host device for initiating transfer of the transport layer packet, the instruction correcting for the latency and enabling the deterministic device interface circuit to receive the transport layer packet for transmission of a corresponding data packet on the deterministic link at the corresponding transmission instance.

18. The one or more non-transitory tangible media of claim 17, wherein:

the determining includes determining the latency exceeds a prescribed time interval between each transmission instance in the deterministic schedule; and the sending of the instruction includes setting a transfer window to an initial transfer window equal to a first integer multiple of the prescribed time interval and exceeding the latency, first transmitting at a request instance, from the deterministic device interface circuit to the host device, a first request for a first transport layer packet, the request instance preceding the corresponding transmission instance for the first transport layer packet by the transfer window, and transmitting each remaining of the integer multiple of the requests following the first request at the corresponding request instance after each prescribed time interval.

19. The one or more non-transitory tangible media of claim 17, further operable for sending a second instruction to the host device for transferring transport layer packets at a transfer rate based on the deterministic schedule establishing a transmission rate as a prescribed time interval between each transmission instance;

the determining of the latency includes identifying a rate difference between a rate of receiving the transport layer packets from the host device and the transmission rate of the deterministic schedule;

the sending including specifying in the instruction one of an exceptional request message or a suppress message for compensation of the rate difference, the exceptional request message for a next transport layer packet before a next scheduled transport layer packet according to the transfer rate, the suppress message for suppressing transmission of the next scheduled transport layer packet that is scheduled according to the transfer rate.

20. The one or more non-transitory tangible media of claim 19, wherein the sending further includes sending at least one of a timing advance message or a timing delay message for further compensation of the rate difference, the timing advance message causing the host device to advance its timing for the next scheduled transport layer packet that is scheduled according to the transfer rate, the timing delay message causing the host device to delay its timing for the next scheduled transport layer packet that is scheduled according to the transfer rate.

* * * * *